(12) United States Patent
Seroussi et al.

(10) Patent No.: US 8,514,222 B2
(45) Date of Patent: Aug. 20, 2013

(54) DEVICE, SYSTEM, AND METHOD OF COMPUTER AIDED DESIGN (CAD)

(75) Inventors: Jonathan Seroussi, Tel-Aviv (IL); Tal Weiss, Petach Tikva (IL)

(73) Assignee: Autodesk, Inc., San Rafael, CA (US)

(*) Notice: Subject to any disclaimer, the term of this patent is extended or adjusted under 35 U.S.C. 154(b) by 1230 days.

(21) Appl. No.: 12/367,533

(22) Filed: Feb. 8, 2009

(65) Prior Publication Data

US 2010/0042676 A1 Feb. 18, 2010

Related U.S. Application Data

(60) Provisional application No. 61/088,376, filed on Aug. 13, 2008.

(51) Int. Cl.
*G06T 17/00* (2006.01)
*G09G 5/00* (2006.01)

(52) U.S. Cl.
USPC ............................ 345/420; 345/619; 345/621

(58) Field of Classification Search
None
See application file for complete search history.

(56) References Cited

U.S. PATENT DOCUMENTS

| | | | |
|---|---|---|---|
| 5,830,032 A | 11/1998 | Campbell | |
| 5,987,242 A | 11/1999 | Bentley et al. | |
| 6,028,610 A | 2/2000 | Deering | |
| 6,094,658 A | 7/2000 | Araki | |
| 6,222,551 B1 * | 4/2001 | Schneider et al. | 345/419 |
| 6,324,532 B1 * | 11/2001 | Spence et al. | 706/27 |
| 7,010,544 B2 | 3/2006 | Wallen et al. | |
| 7,337,093 B2 | 2/2008 | Ramani et al. | |
| 2002/0109715 A1 | 8/2002 | Janson | |
| 2003/0103089 A1 | 6/2003 | Ramani et al. | |
| 2003/0135846 A1 * | 7/2003 | Jayaram et al. | 717/137 |
| 2003/0208285 A1 | 11/2003 | Regli et al. | |
| 2004/0001113 A1 | 1/2004 | Zipperer et al. | |
| 2004/0002841 A1 | 1/2004 | Mayuzumi et al. | |
| 2004/0125103 A1 | 7/2004 | Kaufman et al. | |
| 2005/0213823 A1 | 9/2005 | Ito et al. | |
| 2007/0003119 A1 | 1/2007 | Roehrig et al. | |
| 2008/0077891 A1 | 3/2008 | Dooling et al. | |

OTHER PUBLICATIONS

PCT/IB 09/53568 International Search Report and Written Opinion dated Jan. 14, 2010.

(Continued)

*Primary Examiner* — Kee M Tung
*Assistant Examiner* — Leon T Cain, II
(74) *Attorney, Agent, or Firm* — Gates & Cooper LLP

(57) ABSTRACT

Device, system, and method of Computer-Aided-Design (CAD). A system of CAD may include a client application to communicate with a server and to render to a user a viewport including at least a portion of a CAD model based on data received from the server, wherein the client application is capable of receiving section information from the server, wherein the section information defines a plurality of geometric sections of the CAD model; selecting at least one section of the plurality of sections based on a relationship between the viewport and the boundaries of the plurality of geometric sections; requesting from the server one or more files corresponding to the at least one selected section; receiving the one or more files corresponding to the at least one selected section; and rendering the viewport based on the one or more files. Other embodiments are described and claimed.

34 Claims, 11 Drawing Sheets

(56) References Cited

OTHER PUBLICATIONS

U.S. Appl. No. 12/367,531 as of Jun. 12, 2012, including Non-Final Office Action for U.S. Appl. No. 12/367,531 mailed on Oct. 24, 2011, Amendment by applicant for U.S. Appl. No. 12/367,531 submitted on Jan. 24, 2012, Final Office Action for U.S. Appl. No. 12/367,531 mailed on Feb. 23, 2012, Amendment after Final Rejection for U.S. Appl. No. 12/367,531 submitted by applicant on Apr. 12, 2012 and Notice of Allowance for U.S. Appl. No. 12/367,531 mailed on Apr. 19, 2012.

Deering, "Geometry Compression", May 13, 1995, Sun Microsystems.
Han, "Modeler-independent feature recognition in a distributed environment". Computer-Aided Design, Elsevier Science Ltd., vol. 30, No. 6, 1998, pp. 453-463.
Wang, "PK-Tree: A Spatial Index Structure for High Dimensional Point Data". Information Organization and Databases, Kluwer Academic Publishers, 2000, Chapter 20.
Qiu, "Adaptive Vertex Quantization for Mesh Compression". Computer-Aided Design & Applications, vol. 4, Nos. 1-4, 2007, pp. 219-226.

\* cited by examiner

DEVICE, SYSTEM, AND METHOD OF COMPUTER AIDED DESIGN (CAD)

CROSS-REFERENCE

This application claims priority from and the benefit of U.S. Provisional Patent application 61/088,376, entitled "Device, System and Method of Computer-Aided-Design", filed Aug. 13, 2008, the entire disclosure of which is incorporated herein by reference.

FIELD

Some embodiments relate generally to the field of Computer Aided Design (CAD) and, more particularly, to remotely-accessed, distributed and/or collaborative CAD.

BACKGROUND

The term computer-aided design (CAD) may generally refer to a broad range of computer based tools and/or applications, which may be used in various fields, e.g., in the fields of architecture, engineering, manufacturing, product design, and/or any other suitable field or industry, to construct two-dimensional and/or three-dimensional computer models representing any suitable object, device, system, structure, and/or construction, for example, a building, a bridge, a machine, an electronic element, a chair, a car, and the like.

In recent years, CAD applications have developed to be very complex and demanding and, as a result, the utilization of a CAD model may be restricted to a local environment, e.g., a desktop of a designer and/or engineer, in which the CAD model is generated and/or edited. As a result, one or more other members of a value chain utilizing the CAD model, for example, team members, project managers, suppliers and clients, may have restricted access to review, synchronize and/or co-edit design content of the CAD model.

As traditional enterprise design collaboration and creation solutions require user privileges, administering and pre-installation of desktop applications and browser plug-ins, such solutions may not extend well outside the boundaries of the enterprise. Offline review tools such as the Adobe Acrobat reader may only provide a "read only", disconnected version of the content, which is neither secured nor updateable. Generic web conferencing and screen sharing services, such as WebEx, do not provide remote users with the ability to persistently markup, edit and/or manipulate two-dimensional and/or three-dimensional content, and provide no offline functionality.

With the increasing pressure to shorten time to market and reduce product costs, there is a requirement for efficient design collaboration between the different members of the value chain in order, for example, to prevent costly design iterations and errors.

In one example, relating to the field of Computer Aided Manufacturing (CAM), engineers and manufacturers in various paradigms may be dependent on efficient design collaboration between remote and external design teams, manufacturers, suppliers, subcontractors and the like, in order, for example, to reduce time to market and ensure product quality. Designing products in a distributed approach makes classic control, communication, and collaboration challenges in product development even more challenging. Inefficient design and manufacturing iterations between dispersed parties can cause undesirable long project delays.

In another example, relating to the field of structural and civil engineering, engineers, consultants and project managers worldwide may engage in a lateral and distributed planning processes, in which large networks of professionals may take part in the completion of each project. These distributed design processes make collaboration a critical part in meeting deadlines and avoiding costly design mistakes.

SUMMARY

Some embodiments include, for example, devices, systems, and methods of Computer Aided Design (CAD).

Some embodiments may provide fast and/or efficient communication of two dimensional and/or three-dimensional CAD models, for example, from a user, e.g., a designer, to one or more other users, e.g., one or more other designers, engineers, team members, project managers, suppliers, clients, and the like. In some embodiments, the users may view, edit, and/or co-edit the CAD model and/or exchange between one another suggested changes, e.g., via the Internet and/or an Ethernet communication network.

Some embodiments include a system of CAD, the system including a client application to communicate with a server and to render to a user a viewport including at least a portion of a CAD model based on data received from the server, wherein the client application is capable of receiving section information from the server, wherein the section information defines a plurality of geometric sections of the CAD model, wherein the section information includes boundary information representing a plurality of boundaries defining the plurality of geometric sections, respectively, and a plurality of identifiers to identify the plurality of geometric sections, respectively; selecting at least one section of the plurality of sections based on a relationship between the viewport and the boundaries of the plurality of geometric sections; requesting from the server one or more files corresponding to the at least one selected section, wherein the one or more files include information of one or more geometric elements of the CAD model, which are included within the boundary of the selected section; receiving the one or more files corresponding to the at least one selected section; and rendering the viewport based on the one or more files.

In some embodiments, the client application is to select the at least one section by selecting one or more sections intersecting with the viewport.

In some embodiments, the client application is to request from the server the one or more files corresponding to a plurality of selected sections by sending to the server, substantially simultaneously, a plurality of requests via two or more communication channels.

In some embodiments, the section information includes size information representing data sizes of the plurality of sections, and wherein the client application is to distribute the plurality of requests to the channels based on the data sizes of the selected sections.

In some embodiments, the client application includes a single threaded application, wherein the client application comprises a task manager to manage, according to a multitasking scheme, a plurality of operations for rendering the CAD model by wrapping the plurality of operations by a plurality of respective task objects and assigning the task objects to a plurality of execution queues.

In some embodiments, the plurality of operations include at least one of a data-retrieval operation to retrieve the data corresponding to one or more portions of the CAD model, a construction operation to construct the one or more portions based on the retrieved data, and an editing operation to edit the CAD model.

In some embodiments, the one or more files include at least one of a leading-points file including leading point data of the one or more elements, a rough-geometry file including rough geometry data of the one or more elements, a precision-geometry file including precision data of the one or more elements, and a metadata file including metadata corresponding to the one or more elements.

In some embodiments, the client application is to request the precise-geometry file corresponding to the selected section, if a ratio between a width of the viewport and a display width for displaying the viewport is less than a resolution of the display.

In some embodiments, at least one of the requested files corresponding to the selected section includes spatially compressed geometric information corresponding the section and one or more parameters of a predefined compression scheme, wherein the client application is capable of decompressing the compressed geometric information based on the one or more parameters.

In some embodiments, the one or more parameters include a bit size of a compressed coordinate, which is less than a bit-size of a coordinate of the CAD model.

In some embodiments, the system may include the server, wherein the server includes a stateless server to handle the request for one or more files independently from another request for one or more files.

In some embodiments, the plurality of geometric sections are defined according to a pyramid scheme including one or more pyramid structures, wherein each pyramid structure includes one or more levels, and wherein each level includes at least one geometric section.

In some embodiments, at least one of said pyramid structures includes a plurality of levels, wherein the number of sections in each level is at least two times the number of sections in an immediately-preceding level.

Some embodiments include a method of CAD, the method including receiving from a server section information defining a plurality of geometric sections of a CAD model, wherein the section information includes boundary information representing a plurality of boundaries defining the plurality of geometric sections, respectively, and a plurality of identifiers to identify the plurality of geometric sections, respectively; selecting at least one section of the plurality of sections based on a relationship between a viewport including at least a portion of the CAD model and between the boundaries of the plurality of geometric sections; requesting from the server one or more files corresponding to the at least one selected section, wherein the one or more files include information of one or more geometric elements of the CAD model, which are included within the boundary of the selected section; receiving the one or more files corresponding to the at least one selected section; and rendering the viewport based on the one or more files.

In some embodiments, selecting the at least one section may include selecting one or more sections intersecting with the viewport.

In some embodiments, the method may include requesting from the server the one or more files corresponding to a plurality of selected sections by sending to the server, substantially simultaneously, a plurality of requests via two or more communication channels.

In some embodiments, the method may include distributing the plurality of requests to the channels based on the data sizes of the selected sections.

In some embodiments, the method may include managing, according to a multitasking scheme, a plurality of operations for rendering the CAD model by wrapping the plurality of operations by a plurality of respective task objects and assigning the task objects to a plurality of execution queues.

In some embodiments, the plurality of operations include at least one of a data-retrieval operation to retrieve the data corresponding to one or more portions of the CAD model, a construction operation to construct the one or more portions based on the retrieved data, and an editing operation to edit the CAD model.

In some embodiments, the one or more files include at least one of a leading-points file including leading point data of the one or more elements, a rough-geometry file including rough geometry data of the one or more elements, a precision-geometry file including precision data of the one or more elements, and a metadata file including metadata corresponding to the one or more elements.

In some embodiments, requesting the one or more files corresponding to the selected section may include requesting the precise-geometry file corresponding to the selected section, if a ratio between a width of the viewport and a display width for displaying the viewport is less than a resolution of the display.

In some embodiments, at least one of the requested files corresponding to the selected section includes spatially compressed geometric information corresponding the section and one or more parameters of a predefined compression scheme, and the method includes decompressing the compressed geometric information based on the one or more parameters.

In some embodiments, the one or more parameters include a bit size of a compressed coordinate, which is less than a bit-size of a coordinate of the CAD model.

In some embodiments, the plurality of geometric sections are defined according to a pyramid scheme including one or more pyramid structures, wherein each pyramid structure includes one or more levels, and wherein each level includes at least one geometric section.

In some embodiments, at least one of the pyramid structures includes a plurality of levels, wherein the number of sections in each level is at least two times the number of sections in an immediately-preceding level.

Some embodiments include a computer program product comprising a computer-useable medium including a computer-readable program, wherein the computer-readable program when executed on a computer causes the computer to receive from a server section information defining a plurality of geometric sections of a CAD model, wherein the section information includes boundary information representing a plurality of boundaries defining the plurality of geometric sections, respectively, and a plurality of identifiers to identify the plurality of geometric sections, respectively; select at least one section of the plurality of sections based on a relationship between a viewport including at least a portion of the CAD model and between the boundaries of the plurality of geometric sections; request from the server one or more files corresponding to the at least one selected section, wherein the one or more files include information of one or more geometric elements of the CAD model, which are included within the boundary of the selected section; receive the one or more files corresponding to the at least one selected section; and render the viewport based on the one or more files.

In some embodiments, the computer-readable program causes the computer to select one or more sections intersecting with the viewport.

In some embodiments, the computer-readable program causes the computer to request from the server the one or more files corresponding to a plurality of selected sections by sending to the server, substantially simultaneously, a plurality of requests via two or more communication channels.

In some embodiments, the computer-readable program causes the computer to manage, according to a multitasking scheme, a plurality of operations for rendering the CAD model by wrapping the plurality of operations by a plurality of respective task objects and assigning the task objects to a plurality of execution queues.

In some embodiments, the one or more files include at least one of a leading-points file including leading point data of the one or more elements, a rough-geometry file including rough geometry data of the one or more elements, a precision-geometry file including precision data of the one or more elements, and a metadata file including metadata corresponding to the one or more elements.

In some embodiments, the computer-readable program causes the computer to request the precise-geometry file corresponding to the selected section, if a ratio between a width of the viewport and a display width for displaying the viewport is less than a resolution of the display.

In some embodiments, at least one of the requested files corresponding to the selected section includes spatially compressed geometric information corresponding the section and one or more parameters of a predefined compression scheme, and the computer-readable program causes the computer to decompress the compressed geometric information based on the one or more parameters.

In some embodiments, the one or more parameters include a bit size of a compressed coordinate, which is less than a bit-size of a coordinate of the CAD model.

In some embodiments, the plurality of geometric sections are defined according to a pyramid scheme including one or more pyramid structures, wherein each pyramid structure includes one or more levels, and wherein each level includes at least one geometric section.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
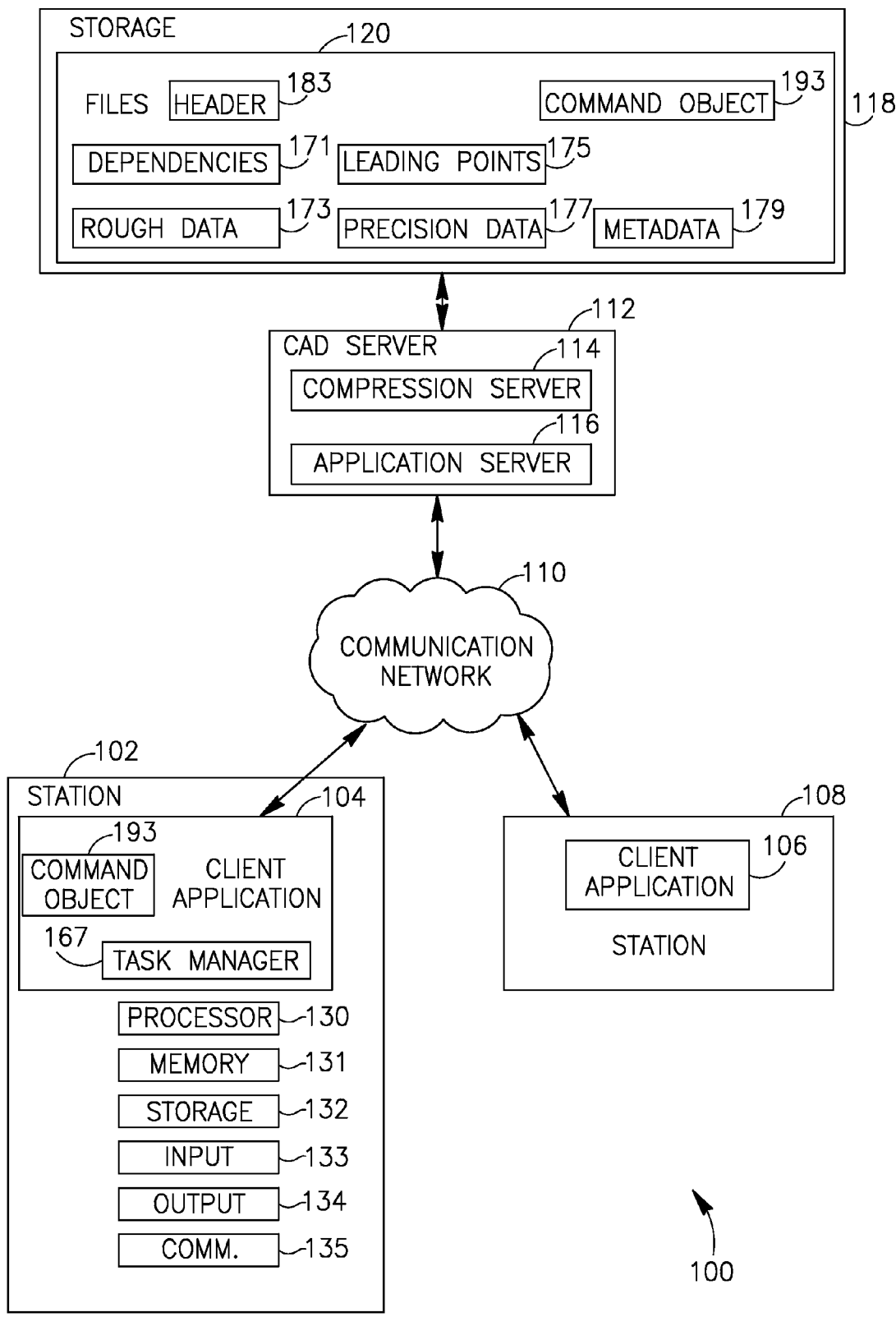
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

The terms "Computer-Aided-Design (CAD) model" and "CAD drawing", as interchangeably used herein, may refer to any suitable two-dimensional (2D), three dimensional (3D) and/or multidimensional CAD drawing, model, schema, plan, diagram and the like, and/or any section or portion thereof, which may represent any suitable object, device, system, structure, and/or construction, for example, a building, a bridge, a machine, an electronic element, a chair, a car and the like, and/or any section or portion thereof.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), Global Positioning System (GPS), Wi-Fi, Wi-Max, ZigBee (TM), Global System for Mobile communication (GSM), 2G, 2.5G, 3G, 3.5G, or the like. Some embodiments may be used in various other devices, systems and/or networks.

Reference is now made to FIG. 1, which schematically illustrates a block diagram of a system 100 in accordance with some demonstrative embodiments.

System 100 includes one or more computing devices, platforms and/or systems ("stations"), for example, a station 102 and a station 108; and at least one CAD server 112 capable of communicating with stations 102 and 108 via a communication network 110. Communication network 110 may include any suitable communication network, for example, an Ethernet communication network, the Internet and/or any combination thereof, and the like.

In some embodiments, stations 102 and/or 108 may include a processor 130, a memory 131, a storage unit 132, an input unit 133, an output unit 134, a communication unit 135, and/or any other suitable component. Processor 130 includes, for example, a multi-core processor (CMP), a multiprocessor, a central processing unit (CPU), a digital signal processor (DSP), a microprocessor, a host processor, a controller, a plurality of processors or controllers, a chip, a microchip, circuitry, a logic unit, an integrated circuit (IC), an application-specific IC (ASIC), or any other suitable multi-purpose or specific processor or controller. Memory 131 includes, for example, a random access memory (RAM), a dynamic RAM (DRAM), a synchronous DRAM (SD-RAM), a flash memory, a volatile memory, or other suitable memory unit. Storage unit 132 includes, for example, a hard disk drive, a floppy disk drive, a compact disk (CD) drive, a CD-ROM drive, a digital versatile disk (DVD) drive, or other suitable removable or non-removable storage units. Input unit 133 includes, for example, a keyboard, a keypad, a mouse, a touch-pad, a stylus, a microphone, or other suitable pointing device or input device. Output unit 134 includes, for example, a cathode ray tube (CRT) monitor or display unit, a liquid crystal display (LCD) monitor or display unit, a screen, a monitor, or other suitable image and/or video display or output device. Communication unit 135 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data over communication network 110. Communication unit 135 may optionally include, or may optionally be associated with, for example, one or more antennas, e.g., a dipole antenna, a monopole antenna, an omni-directional antenna, an end fed antenna, a circularly polarized antenna, a microstrip antenna, a diversity antenna, or the like.

In some embodiments, stations 102 and/or 108 may include, or may be, a Personal Computer (PC); a desktop computer; a mobile computer; a laptop computer; a notebook computer; a tablet computer; a server computer; a handheld computer; a handheld device; a Personal Digital Assistant (PDA) device; a handheld PDA device; an on-board device; an off-board device; a hybrid device; a vehicular device; a non-vehicular device; a mobile or portable device; a non-mobile or non-portable device; a wireless communication station; a wireless communication device; a unit or device of a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), a two-way radio communication system, and/or a cellular radio-telephone communication system; a cellular telephone; a wireless telephone; a Personal Communication Systems (PCS) device; a PDA device which incorporates a wireless communication device; a device which incorporates a GPS receiver or transceiver or chip; a Multiple Input Multiple Output (MIMO) device; a Single Input Multiple Output (SIMO) device, a Multiple Input Single Output (MISO) transceiver or device; a multi-standard radio device, a wired or wireless handheld device (e.g., BlackBerry, Palm Treo), a Wireless Application Protocol (WAP) device, or the like.

In some embodiments, stations 102 and/or 108 may include, may be associated with, or may perform the functionality of client applications 104 and/or 106, respectively. Client applications 104 and/or 106 may communicate with server 112 and render to the users of stations 102 and/or 108, respectively, a viewport including at least a portion of a CAD model based on data received from server 112, e.g., as described in detail below.

In some embodiments, client applications 104 and 106 may be implemented using any suitable web-based application, a web-site, a web-page, a stand-alone application, a plug-in, an ActiveX control, a rich content component, e.g., a Flash or Shockwave component, or the like, as described below. In other embodiments, client applications 104 and/or 106 may be implemented in any other suitable form.

In some embodiments, system 100 may also include a storage 118 capable of storing a plurality of files 120 corresponding to the CAD model, e.g., as described in detail below. In one embodiment, storage 118 may be implemented as part of a Structured Query Language (SQL) server. In another embodiment, storage 118 may be implemented as part of an elastic storage cloud, e.g., the Amazon S3 Elastic Compute Cloud. In other embodiments, storage 118 may include or may be implemented as part of any suitable remote and/or local storage device, storage system, storage scheme, storage cloud, and the like.

In some embodiments, CAD server 112 may include at least one application server 116 and at least one compression server 114, as are described in detail below. In some embodiments, servers 114 and 116 may be implemented by two physically separate servers, which may be located at the same location or at different locations. In other embodiments, servers 114 and 116 may be implemented as part of a single server.

Figure 2:
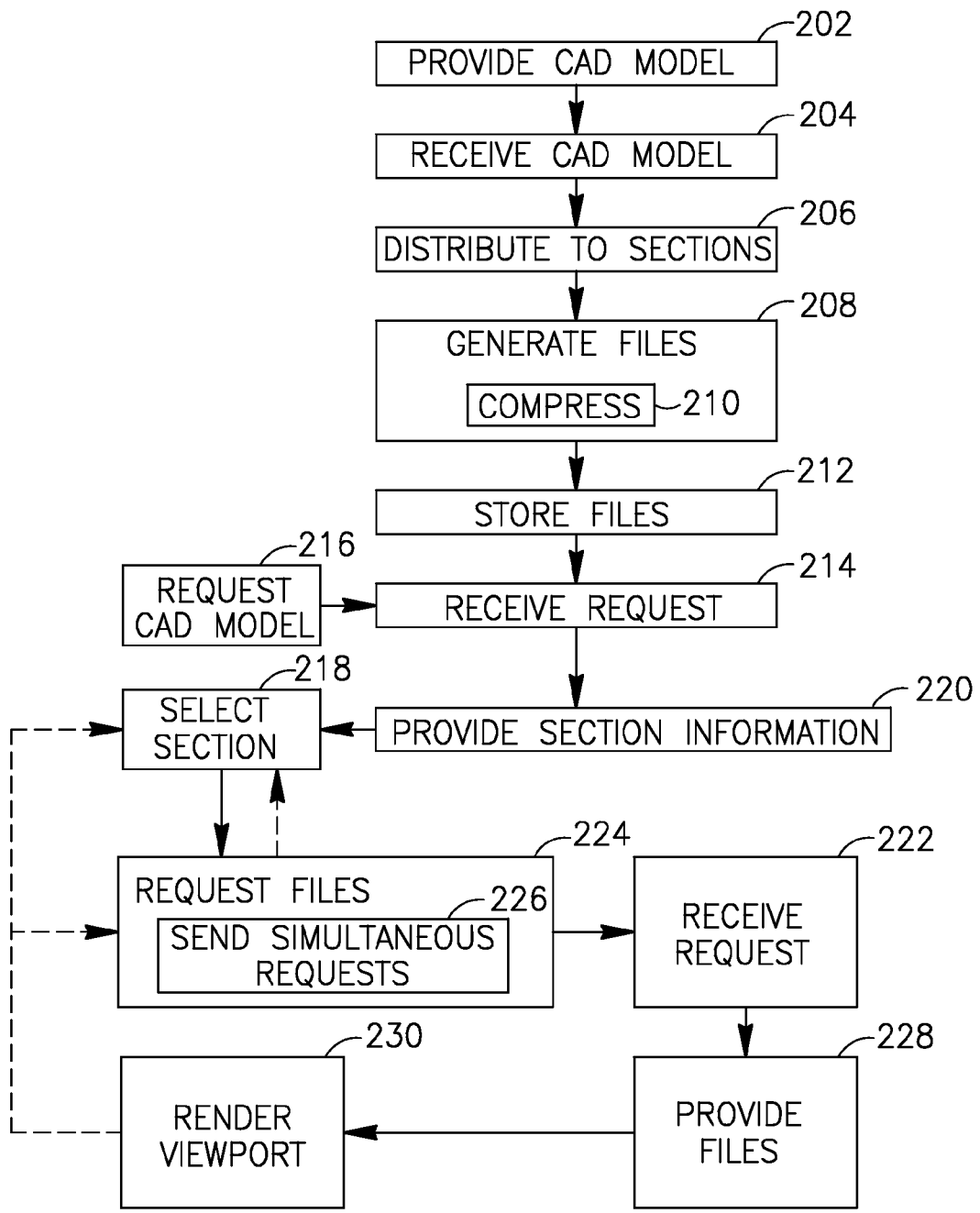
FIG. 2 is a schematic flow-chart illustration of a method of Computer-Aided-Design (CAD) in accordance with some demonstrative embodiments.

Reference is made to FIG. 2, which schematically illustrates a method of computer-aided design in accordance with some demonstrative embodiments. In some embodiments, one or more operations of the method of FIG. 2 may be performed by one or more elements of system 100 (FIG. 1), e.g., CAD server 112 (FIG. 1), application server 116 (FIG. 1), compression server 114 (FIG. 1), and/or client applications 104 and/or 106 (FIG. 1), for example, to render to a user a viewport including at least a portion of a CAD model. In other embodiments, one or more of the operations of the method of FIG. 2 may be performed by one or more additional or alternative elements for any other suitable purpose.

As indicated at block 204, the method may include receiving a CAD model.

In some embodiments, application server 116 (FIG. 1) may be capable of receiving a CAD model including a plurality of geometric elements in any suitable format. For example, server 116 (FIG. 1) may receive the CAD model as part of one or more CAD files of any suitable CAD file format, e.g., a DWG or a DXF file format generated by the AutoCAD® application. Server 116 may also receive one or more support CAD files, e.g., including font definitions, line definitions, style definitions, plot definitions, and/or any other suitable information relating to the CAD model and/or CAD files.

The terms "geometric element" and "geometric shape", as interchangeably used herein, may refer to any suitable, e.g., 2D or 3D, geometric entity, figure, shape and/or contour including and/or defined by one or more vertices, points, lines, and the like. The geometric element may include, for example, a circle, an ellipse, a box, a ball, a polyline, a polygon, a curve, an arc, a cube, a pyramid, an area, a plane, a surface, and the like.

The term "vertex" may be used herein to refer to a set of coordinates defining a point within a coordinate system. For example, a vertex may include a set of two coordinates representing a point in a 2D coordinate system e.g., 'x' and 'y', 'r' and 'θ', or any other suitable coordinate system; a set of three coordinates representing a point in a 3D coordinate system e.g., 'x', 'y', and 'z'; 'r', 'θ' and 'φ'; or any other set of coordinates corresponding to any other suitable coordinate system.

As indicated at block 202, the method may include providing the CAD model. In one embodiment, application server 116 (FIG. 1) may receive the CAD model from stations 102 and/or 108 (FIG. 1), e.g., via communication network 110 (FIG. 1). In one example, client application 104 (FIG. 1) may provide the CAD model to application server 116 (FIG. 1). In another example, any other suitable module and/or application of stations 102 and/or 108 (FIG. 1) may provide the CAD model to application server 116 (FIG. 1). In other embodiments, application server 116 (FIG. 1) may receive the CAD model from any other suitable source, e.g., from another station and/or any other suitable device or application.

As indicated at block 206, the method may include distributing a plurality of geometric elements of the CAD model to a plurality of geometric sections, e.g., as described below with reference to FIG. 4. For example, CAD server 112 (FIG. 1) may distribute the plurality of geometric elements of the CAD model to the plurality of geometric sections.

As indicated at block 208, the method may include generating for each section of the plurality of sections one or more files including geometric information of the geometric elements distributed to the section. For example, CAD server 112 (FIG. 1) may generate files 120 (FIG. 1), e.g., as described below.

In some embodiments, application server 116 (FIG. 1) may distribute the plurality of geometric elements of the CAD model to a plurality of geometric sections; and generate for each section of the plurality of sections one or more files including geometric information of the geometric elements distributed to the section, e.g., as described below with reference to FIG. 4.

As indicated at block 210, the method may include compressing the geometric information of at least one section of the sections according to a predefined compression scheme. For example, compression server 114 (FIG. 1) may compress the geometric information of at least one section, e.g., as described below with reference to FIG. 5.

As indicated at block 212, the method may include storing the files corresponding to the plurality of sections. For example, CAD server 112 (FIG. 1) may store files 120 on storage 118 (FIG. 1), e.g., as described below.

As indicated at block 216, the method may include generating a request to utilize the CAD model. For example, client application 104 (FIG. 1) may request the CAD model to be rendered to a user of station 102.

As indicated at block 214, the method may include receiving the request to utilize the CAD model. For example, CAD server 112 (FIG. 1) may receive the request.

As indicated at block 220, the method may include providing section information defining a plurality of geometric sections of the requested CAD model. For example, application server 116 (FIG. 1) and/or CAD server 112 (FIG. 1) may provide client application 104 (FIG. 1) with information defining the plurality of geometric sections of the CAD model, e.g., in the form of a dependencies file 171 (FIG. 1) as described below.

As indicated at block 218, the method may include selecting at least one section of the plurality of geometric sections based on a relationship between a viewport to be rendered to the user and the boundaries of the plurality of geometric sections. For example, client application 104 (FIG. 1) may select at least one of the geometric sections based on the viewport to be rendered to the user of station 102 (FIG. 1), as described below.

As indicated at block 224, the method may include requesting one or more files corresponding to the at least one selected section. For example, client application 104 (FIG. 1) may request from CAD server 112 (FIG. 1) one or more files 120 (FIG. 1) including information of one or more geometric elements of the CAD model, which are included within the boundary of the selected section, e.g., as described below.

As indicated at block 226, the method may include sending, substantially simultaneously, a plurality of requests via two or more communication channels. For example, client application 104 (FIG. 1) may request from CAD server 112 (FIG. 1) the one or more files corresponding to a plurality of selected sections by sending to CAD server 112 (FIG. 1), substantially simultaneously, a plurality of requests via two or more communication channels over network 110 (FIG. 1), e.g., as described below.

As indicated at block, 222, the method may include receiving the request for the one or more files. For example, CAD server 112 (FIG. 1) may receive the request for the files, e.g., as described below.

As indicated at block 228, the method may include providing the requested files. For example, CAD server 112 (FIG. 1) may retrieve the requested files from storage 118 (FIG. 1) and provide the requested files to client application 104 (FIG. 1), e.g., as described below.

As indicated at block 230, the method may include rendering the viewport based on the one or more requested files. For example, client application 104 (FIG. 1) may receive the one or more files corresponding to the at least one selected section, and render the viewport based on the one or more files, e.g., as described below.

In some embodiments, the method may include selecting one or more additional sections, e.g., as described above with reference to block 218, and/or requesting additional files corresponding to the selected sections and/or the additional sections, e.g., as described above with reference to block 224. For example, client application 104 (FIG. 1) may select the additional sections and/or request additional files 120 (FIG. 1) if, for example, the viewport is changed, e.g., by user of station 102; as part of streaming data during idle time; and/or if additional layers of data are required, e.g., as a result of interaction of the user with the CAD model, e.g., as described herein.

Referring back to FIG. 1, in some embodiments, CAD server 112 and/or application server 116 may operate as stateless servers, e.g., with respect to the content and/or destination of the requested files 120. For example, CAD server 112 and/or application server 116 may handle the request for one or more files independently from another request for one or more files. Accordingly, client application 104 may be able to switch between application server 116 and/or CAD server 112 and another application server and/or CAD server without having to transfer any state between the servers. Additionally, this architecture of system 100 may promote scalability and/or load-balancing, e.g., as described below, since for example, servers 112 and/or 116 may not be required to directly load the CAD model to station 102, e.g., to memory 131.

In some embodiments application server 116 may distribute the received CAD model according to a scalable distribution scheme, for example, in terms of the number of geometric sections distributed to each section and/or the data-size, e.g., in Kilobytes (Kb), of each geometric section. In other embodiments, the geometric sections may be defined according to any other suitable scheme.

The geometric elements of some CAD models may be unequally and/or unevenly scattered throughout the CAD model and, as a result, a relatively large amount of data may be unequally and/or unevenly associated with different geographic portions of the CAD model. For example, one or more geographical portions of the CAD model may include a relatively large number of geometric elements, and/or relatively detailed and/or complex geometric elements, e.g., in terms of a number of vertices included in the geographical portion, while one or more other portions of the CAD model may include a relatively small number of geometric elements, and/or relatively less-detailed and/or less-complex geometric elements, e.g., in terms of a number of vertices included in the geographical portion.

In some embodiments, application server 116 may be capable of adaptively and/or recursively distributing the geometric elements of the CAD model to the plurality of geometric section, e.g., as described in detail below.

In some embodiments, application server 116 may initially distribute the geometric elements of the CAD model according to a predefined ("default") section scheme; and based on predefined criteria, recursively redefine one or more of the geometric sections. For example, if the data size, e.g., in Kb, of the geometric elements distributed to a geometric section is greater than a predefined threshold data size, then application server 116 may recursively divide the geometric section into two or more geometric sections, e.g., until the data size of the geometric elements distributed to each of the resulting sections is less than or equal to the threshold data size.

In some embodiments, the plurality of geometric sections may be defined according to a pyramid scheme including one or more pyramid structures, wherein each pyramid structure includes one or more levels, and wherein each level includes at least one geometric section, e.g., as described below. In other embodiments, the geometric sections may be defined according to any other suitable scheme.

In some embodiments, at least one of the pyramid structures may include a plurality of levels, wherein the number of sections in each level is greater than the number of sections in an immediately-preceding level, e.g., at least two times the number of sections in an immediately-preceding level. In one embodiment, the number of sections in each level of the pyramid structure may be four times the number of sections in an immediately-preceding level, e.g., as described below.

Figures 3A, 3B:
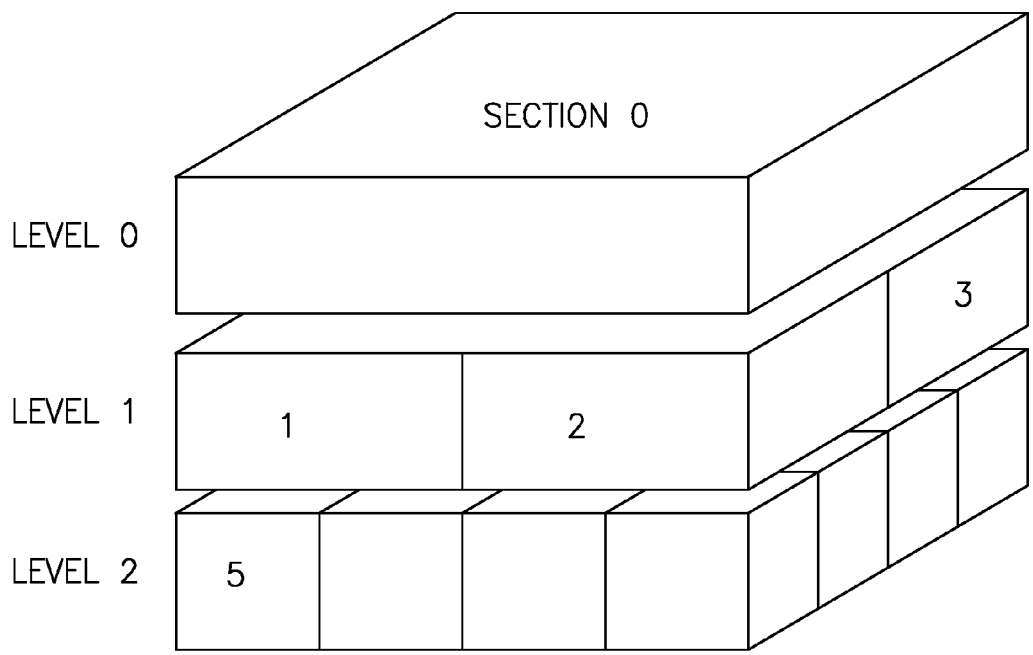
FIGS. 3A and 3B are schematic illustrations of three-dimensional and two-dimensional representations, respectively, of a pyramid structure, in accordance with some demonstrative embodiments.

FIGS. 3A and 3B schematically illustrate three-dimensional and two-dimensional representations, respectively, of three levels of a pyramid structure 300, in accordance with some demonstrative embodiments. As shown in FIGS. 3A and 3B, an $x^{th}$ level of pyramid structure 300, wherein x=0, 1, 2 . . . , may include $4^x$ equally-sized rectangular sections, which may be defined according to the boundaries of the rectangles, as shown in FIG. 3B. For example, the level x=0 may include a single section, the level x=1 may include four sections, the level x=2 may include sixteen sections, and so on.

In some embodiments, each geometric section may be assigned with an identifier (ID) to identify the section, e.g., uniquely with relation to all other sections in the distribution scheme. For example, the single section of the level x=0 may be assigned with a first ID number, e.g., zero; the four sections of the level x=1 may be assigned with four different ID numbers, e.g., 1-4, respectively; and the sixteen sections of the level x=2 may be assigned with sixteen different ID numbers, e.g., 5-20, respectively.

In some embodiments, the number of levels in pyramid structure 300 may be initially determined based on any suitable predefined criteria, e.g., based on the number of geometric elements ("the shapes count") of the CAD model. For example, the number of levels in pyramid structure 300 may be initially determined as follows:

$$n_{l\text{-}init} = \log 10(SC/1000) \tag{1}$$

wherein $n_{l\text{-}init}$ denotes the initial number of levels, and SC denotes the shapes count of the CAD model. In other embodiments, the number of levels in pyramid structure 300 may be initially determined based on any other suitable criteria.

In some embodiments, a geometric element belonging to a geometric section of a pyramid structure ("the embedding pyramid structure") may be associated, directly or indirectly, with at least one other pyramid structure and/or with one or more geometric sections of at least one other pyramid structure ("the embedded pyramid structure"). For example, the geometric element may refer to the embedded pyramid structure using any suitable translation, transform, scale, rotate matrix, and the like, to translate coordinates within the embedded pyramid structure to a coordinate within the embedding pyramid structure. The embedded pyramid structure may include, for example, an embedded model and/or a reference to an external CAD model. For example, if the CAD model includes a plurality identical units, e.g., an architectural diagram including a plurality of identical electrical sockets, then the embedding pyramid structure may refer, e.g., a plurality of times, to an embedded pyramid structure including the details of the unit, e.g., a diagram of the electrical socket. The embedded pyramid structure may also embed one or more other structures, and so on. The relationship and/or translation between the embedding and embedded pyramid structures and/or the may be stored by CAD server 112, for example, as part of the dependencies file 171 described below.

Figure 3C:
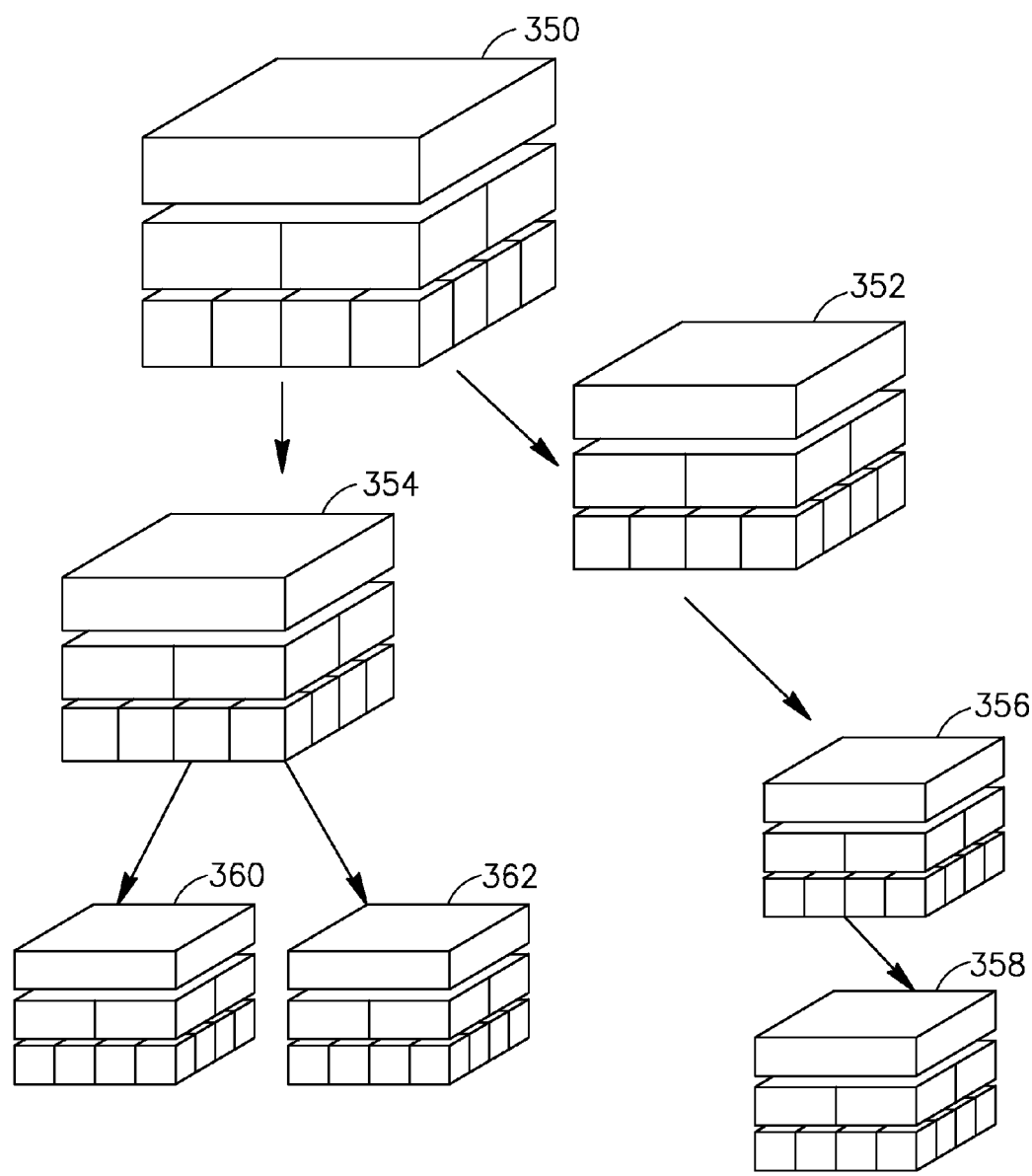
FIG. 3C is a schematic illustration of a pyramid structure embedding a plurality of other pyramid structures, in accordance with some embodiments.

FIG. 3C schematically illustrates a pyramid structure 350 embedding a plurality of other pyramid structures, in accordance with some embodiments. As shown in FIG. 3C, pyramid structure 350 may directly embed a first pyramid structure 352 and a second pyramid structure 354, e.g., a geometric element of a first section of pyramid structure 350 may embed pyramid structure 352, and a geometric element of a second section of pyramid structure 350 may embed pyramid structure 354. As also shown in FIG. 3C, embedded pyramid structure 352 may directly embed a pyramid structure 356, which in turn may directly embed a pyramid structure 358. As further shown in FIG. 3C, pyramid structure 354 may directly embed a first pyramid structure 360 and a second pyramid structure 362. As a result, pyramid structure may indirectly embed pyramid structures 356, 358, 360 and 362.

Figure 4:
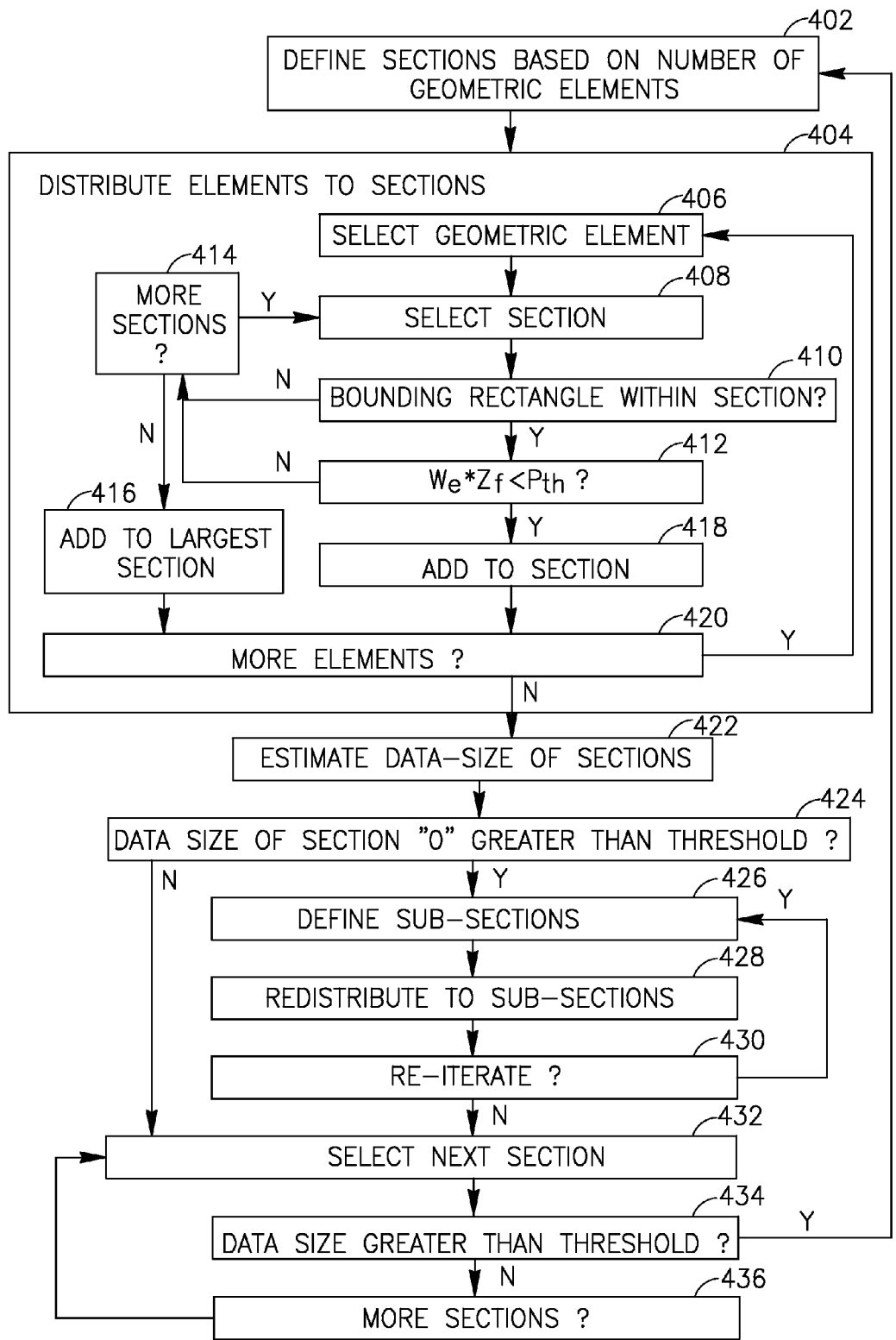
FIG. 4 is a schematic flow-chart illustration of a method of distributing a plurality of geometric elements of a CAD model to a plurality of sections, in accordance with some demonstrative embodiments.

Reference is now made to FIG. 4, which schematically illustrates a method of distributing a plurality of geometric elements of a CAD model to a plurality of sections, in accordance with some demonstrative embodiments. In some embodiments, one or more operations of the method of FIG. 4 may be implemented by a server, e.g., CAD server 112 (FIG. 1) and/or application server 116 (FIG. 1).

As indicated at block 402, the method may include defining the plurality of geometric sections based on a number of the plurality of geometric elements, for example, based on the shapes count of the CAD drawing, e.g., in accordance with Equation 1.

In some embodiments, defining the plurality of sections may include defining the plurality of sections, while assuming a scenario ("worst case scenario") in which the viewport to be rendered to the user includes the entire CAD drawing.

In some embodiments, defining the plurality of sections may also include defining the sections by assigning each section to a portion of the CAD drawing based on a predefined default section scheme, e.g., the default pyramid scheme described above with reference to FIGS. 3A and 3B.

In some embodiments, defining the plurality of sections may also include determining a zoom factor, denoted $Z_f$, for one or more of the geometric sections, e.g., for each of the sections. The zoom factor may be determined, for example, based on a screen resolution of a display, e.g., output unit 134 (FIG. 1), intended to render the CAD drawing. In one example, the zoom factor corresponding to a geometric section may be determined as follows:

$$Z_f = R_s / W_s \qquad (2)$$

wherein $W_s$ denotes a width, e.g., in terms of pixels, of the section; and wherein $R_s$ denotes the screen resolution, e.g., in terms of pixels.

As indicated at block 404, the method may include distributing the geometric elements to the plurality of sections. In some embodiments, the geometric elements may be distributed to the plurality of sections based on the size of a bounding rectangle of each of the geometric elements, e.g., as described below. In other embodiments, the geometric elements may be distributed to the plurality of sections based on any other suitable criterion.

In some embodiments, distributing the geometric elements to the plurality of sections may include iterating over the plurality of geometric elements and, for each element, determining a geometric section to which the geometric element is to be distributed, e.g., by iterating over the plurality of geometric sections, as described below. In other embodiments, the geometric elements may be distributed to the plurality of sections in any other suitable manner.

As indicated at block 406, the method may include selecting a geometric element ("the currently selected geometric element"). The method may also include determining a bounding rectangle of the currently selected geometric element.

As indicated at block 408, the method may include selecting a section. In some embodiments, the selected section may include the smallest section, e.g., in terms of area, which has not yet been examined with respect to the currently selected geometric element.

As indicated at block 410, the method may include determining whether or not the bounding rectangle of the currently selected geometric element is included within the selected section.

As indicated at block 412, the method may include determining whether or not a predefined condition relating to the currently selected geometric shape and to the selected section is met. For example, determining whether or not a predefined condition is met may include determining whether or not the following condition is met:

$$W_e * Z_f < P_{Th} \qquad (3)$$

wherein $W_e$ denotes a width of the currently selected geometric element, e.g., in terms of pixels; $Z_f$ denotes the zoom factor of the selected section; and $P_{Th}$ denotes a predefined threshold, e.g., a predefined number of pixels. For example, the threshold $P_{Th}$ may be defined as five pixels. Determining whether or not Condition 3 is met may be equivalent to determining whether or not the currently selected geometric element will be visible to a user within less than $P_{Th} * P_{Th}$ pixels, when using a viewport defined by the boundaries of the selected section.

As indicated at block 418 the method may include adding the currently selected geometric element to the selected section, e.g., if the predefined condition is met.

As indicated at block 414, the method may include determining whether or not there are additional sections to be examined with respect to the currently selected geometric element, e.g., if it is determined that the bounding rectangle of the currently selected geometric element is not included within the selected section, or if it determined that the predefined condition is not met.

If there are additional sections to be examined, the method may include selecting another section to be examined, e.g., as described above with reference to block 408.

As indicated at block 416, the method may include adding the currently selected geometric element to a largest section of the sections, in terms of area, e.g., if all sections have already been examined with respect to the currently selected geometric element. For example, the currently selected geometric element may be added to the section having the zero ID as described above with reference to FIGS. 3A and 3B As indicated at block 420, the method may include determining whether or not there are additional geometric elements to be distributed. The method may include selecting another geometric element to be distributed, for example, as described above with reference to block 406, e.g., if there are one or more additional geometric elements to be distributed.

As indicated at block 422, the method may include estimating a data size of each section based on the geometric elements distributed to the section, e.g., after all geometric elements have been distributed to the sections. In some embodiments, the data size of an i-th section, denoted $DS_i$, may be determined as follows:

$$DS_i = SC_i * h + V_i * v \qquad (4)$$

wherein $SC_i$ denotes a shape count of the i-th section; h denotes a shape header data size, e.g., 20 bits or any other suitable value; $V_i$ denotes a number of vertices in the i-th section; and v denotes a vertex data size, e.g., between five and six bytes or any other suitable value.

In some embodiments, if the estimated data size of a section is greater than a predefined threshold, then the method may include defining a plurality of additional sections, re-distributing to the additional sections one or more of the geometric elements, which were previously distributed to the section, and repeating the estimating and re-distributing for each of the additional sections until the estimated data size of each of the additional sections is equal to or less than the threshold, e.g., as described below.

In some embodiments, the largest section, e.g., the section having the zero ID, may include relatively large geometric elements, which may span, for example, across relatively large portions of the CAD drawing. Accordingly, such large geometric elements may not be re-distributed according to the distribution operations described above with reference to block 404. According to these embodiments, a plurality of sub-sections may be defined, such that one or more of the geometric elements may be divided, "broken up", and/or distributed to the sub-sections while not considering, for example, the zoom factor of the section, e.g., as described below.

A indicated at block 424, the method may include determining whether or not the data size of the largest section is greater than a first predefined data-size threshold, e.g., 250 Kb or any other suitable data size.

As indicated at block 426, the method may include defining a plurality of sub-sections covering a plurality of respective portions of the largest section. In one embodiment, the entire largest section may be divided into the plurality of sub-sections. For example, the largest section may be divided into four, e.g., equally sized, sub-sections, each covering, for example, a quarter of the largest section. In other embodiments, the sub-sections may be defined according to any other suitable scheme.

As indicated at block 428, the method may include redistributing the geometric elements of the largest section to the plurality of sub-sections. For example, a geometric element may be distributed to a sub-section if, e.g., only if, the bounding rectangle of the geometric element is included within the sub-section, for example, without considering the zoom factor.

As indicated at block 430, the method may include determining whether or not there is a need to re-iterate over one or more of the sub-sections. For example, the data size of the sub-sections may be estimated, e.g., in accordance with Equation 4; and the operations of blocks 426 and 428 may be repeated with respect to a sub-section, e.g., if the data size of the sub-section is greater than the first data-size threshold. The iteration over the sub-sections may be terminated, for example, if the data size of each of the sub-sections is equal to or less than the first data-size threshold, or if a data size of at least one sub-section does not decrease below the first data-size threshold during the iteration of the operations of blocks 426 and 428.

In some embodiments, if the data size of a section other than the largest section is greater than a second predefined data-size threshold, then one or more geometric elements of the section may be recursively re-distributed while treating the section as a CAD drawing in itself. As a result, another pyramid structure may be defined stemming from the section. The second data-size threshold may be equal to or different than the first data-size threshold. For, example, the second data-size threshold may be 750 Kb or any other suitable size.

As indicated at block 432, the method may include selecting a section of the plurality of sections, other than the largest section.

As indicated at block 434, the method may include determining whether or not the data size of the selected section is greater than the second data-size threshold. The method may include recursively defining another pyramid structure stemming from the section, e.g., by performing the operations described above with reference to blocks 402, 404, 422, and 424 while treating the section as a CAD drawing in itself, e.g., if the data size of the section is greater than the second data-size threshold.

As indicated at block 436, the method may include determining whether or not there are additional sections to be examined, e.g., if the data size of the section is equal to or less than the second data-size threshold. The method may include selecting another section to be examined, for example, as described above with reference to block 432, e.g., if there are one or more other sections to be examined.

Referring back to FIG. 1, in some embodiments CAD server 112 and/or application server 116 may divide the data relating to the geometric elements of a section, e.g., of each section of the plurality of sections, into a plurality of predefined data levels. In some embodiments, the plurality of data levels may include four data levels, e.g., as described below. In other embodiments, the plurality of data levels may include any other suitable data levels.

In some embodiments, CAD server 112 may divide the data of the geometric elements of each section into four data levels. For example, CAD server 112 may divide the data of the geometric elements of each section into a first level ("leading points level") including leading point data for each of the geometric elements included in the section; a second level ("rough geometry level") including rough geometry data for each of the geometric elements included in the section; a third level ("precision geometry level") including precision geometry data for each of the geometric elements included in the section; and a fourth level ("metadata level") including metadata for each of the geometric elements included in the section, as described below.

The term "leading point data" as used herein with relation to a geometric element may refer to any suitable information, data and/or values representing at least one point, e.g., a single point, which may be used to identify, represent and/or define the geometric element. For example, a leading point of a circle may include a center of the circle, a radius of the circle, and the like; a leading point of a polyline may include a point on the polyline, e.g., a first point of the polyline, an end point of the polyline, and the like; a leading point of an ellipse may include a focus of the ellipse, a semi-latus rectum of the ellipse, a latus rectum of the ellipse, a directrix of the ellipse, and the like.

In some embodiments, the leading point data corresponding to a section may include a single leading point for each geometric element included in the section. In other embodiments, the leading point data may include any other suitable number of leading points and/or any other suitable information.

In some embodiments, the leading point data may include rough leading point data, for example, the integer portion of each leading point, a rounded value of each leading point, a predefined number of decimal digits of each leading point, and the like.

The term "rough geometry data" as used herein with relation to a geometric element may refer to any suitable information, data and/or values roughly, nearly, generally and/or approximately defining the geometric element, e.g., by defining one or more points, angles, distances, and the like. The rough geometry data may include, for example, the integer portion of each of the values defining the geometric element, a rounded value of each of the values defining the geometric element, a truncated value of each of the values defining the geometric element, a predefined number of decimal digits of each of the values defining the geometric element, and the like.

The term "precision data" as used herein with relation to a geometric element may refer to any suitable information, data and/or values to define the geometric element at a greater precision and/or accuracy compared to the rough geometry data. For example, the precision data may define the geometric element essentially precisely, exactly, accurately and/or with an error equal to or less than a predefined precision-error. The precision data may include, for example, floating point data of each of the values defining the geometric element, one or more decimal digits, which were not included in the rough geometry data, of each of the values defining the geometric element, and the like.

The term "metadata" as used herein with relation to a geometric element may include any suitable, e.g., non-geometric, information and/or attributes related to and/or associated with the geometric element, for example, a material of a module to be produced based on the geometric element, a manufacturer of the module, a type of the module, a part number of the module, a pointer to one or more other geometric elements, and the like.

For example, if the geometric element includes an ellipse having a focus at the coordinates X=12,200.45:Y=3057.34; Z=400.156, a semi-latus spectum of a=3.6, and a focus-vertex distance of b=4.245, wherein the ellipse represents a cross-section of a pipe of a predefined type "A" manufactured by a manufacturer "B", then the leading point data may include the leading point X'=12, 000:Y'=3057;Z'=400. The rough geometry data may include the rough values a'=3 and b'=4 of the semi-latus spectum and focus-vertex distance, respectively. The precision data may include the values X=12,200.45: Y=3057.34;Z=400.156, a=3.6 and b=4.245; and/or values representing the differences X-X':Y-Y':Z-Z', a-a' and/or b-b'. The metadata may include the data "pipe type=A" and/or "Manufacturer=B", ad/or any other suitable data.

In some embodiments, CAD server 112 may generate for at least one of the plurality of sections, e.g., for each section of the plurality of sections, one or more files 120 including geometric information of the geometric elements distributed to the section.

In some embodiments, for at least one section of the plurality of sections, e.g., for each section of the plurality of sections, CAD server 120 may generate four, e.g., separate, files including a leading-points file 175 including the leading point data of the section, a rough geometry file 173 including the rough geometry data of the section, a precision-geometry file 177 including precision data of the section, and a metadata file 179 including metadata of the section.

In some embodiments, the separation of the geometric data of a section into at least four, e.g., separate, files 120, e.g., the leading-points, rough geometry, precision-geometry, and metadata files described above, may allow CAD server 112 to act as a stateless server capable of handling requests for one or more files 120 relating to one or more sections, independently and/or separately from requests for one or more other files relating to the one or more sections and/or one or more other sections, e.g., as described herein.

In some embodiments, application server 116 may also provide, e.g., in the form of dependencies file 171, information defining the plurality of geometric sections of the CAD model. Application server 116 may provide dependencies file 171 to client applications 104 and/or 106, for example, in order to allow client applications 104 and/or 106 to request files 120 corresponding to one or more of the sections, as described in detail below. The section information may include, for example, boundary information representing the plurality of boundaries, e.g., the bounding rectangles described above with reference to FIGS. 3A and 3B, defining the plurality of geometric sections, respectively; and a plurality of IDs identifying the plurality of geometric sections, respectively, e.g., the IDs described above with reference to FIGS. 3A and 3B. In some embodiments, dependencies file 171 may also include the estimated data size $DS_i$ of each section, e.g., determined according to Equation 4.

In some embodiments, CAD server 112 may iterate over the plurality of sections, e.g., to iteratively generate files 120 corresponding to each of the sections. For example, for each iterated section CAD server 112 may store the leading point data of the geometric elements belonging to the section in the leading points file 175 corresponding to the section; store the rough geometric data of the geometric elements belonging to the section in the rough geometry file 173 corresponding to the section; store the precision data of the geometric elements belonging to the section in the precision-geometry file 177 corresponding to the section; store the metadata of the geometric elements belonging to the section in the metadata file 179 corresponding to the section; and store in dependencies file 171 information associating between the section ID of the section and the leading points file, the rough geometry file, the precise-geometry file and the metadata file.

In some embodiments, compression server 114 may apply any suitable compression scheme to compress the contents of the data corresponding to the geometric sections.

In some embodiments, the compression scheme may include a style compression scheme and/or a spatial compression scheme, e.g., as are described below. In other embodiments, the compression scheme may include any suitable additional and/or alternative compression scheme.

In some embodiments, a geometric element of the CAD model may be assigned with one or more style properties and/or attributes, for example, color, line weight, line style and the like. In some embodiments, storing information regarding these properties for each geometric element may require a relatively large number of bits, while the CAD model may usually utilize a relatively small number of available settings of one or more of the properties. For example, the CAD model may utilize only a few colors, a few line weights an/or a few line styles.

In some embodiments, CAD server 112 may define a plurality of style objects based on the different settings of the properties utilized by the CAD model. For example, each style object may be defined by a different combination of settings for the properties. For example, a first style object may include a first combination of color, line style and line weight; a second style object may include a second combination of color, line style and line weight, wherein at least one of the color, line style and line weight is different than the color, line style and line weight, respectively, of the first style object; and so on. In one example, a first style object may include a red dashed line having a weight of one; a second style object may include a red dashed line having a weight of two; a third style object may include a blue dashed line having a weight of one; a fourth style object may include a green semi-dashed line having a weight of three, and so on. Each style object may be identified by an identifier, e.g., a unique style index.

In some embodiments, CAD sever 112 may store, e.g., in storage 118, style-object information including the identifiers of the plurality of style objects and the settings and/or definitions of the style objects. In one example, the style-object information may be stored as part of a header file 183 associated with the CAD model. Header 183 may also include or be part of, for example, dependencies file 171.

Ins some embodiments, CAD server 112 may assign to each geometric element in a section a style index corresponding to the predefined style object having the same style settings as the geometric element.

In some embodiments, a bit size of the style identifier may be based on the number of combinations of the different style settings. For example, a style identifier having a bit size of $\log_2(L*M*N)$ may be required, for example, if the CAD model includes L different types of color, M different types of line style, and N different types of line weight. In one example, CAD server 112 may utilize an integer style identifier having a bit size of $\log_2(10*10*10)$, e.g., if the CAD model makes use of ten different colors, ten different line styles, and ten different line weights.

In some embodiments, CAD server 112 may store the style ID corresponding to each geometric element as part of files 120 corresponding to the section including the geometric element, e.g., as part of rough geometry file 173 corresponding to the section.

In some embodiments, compression server 114 may spatially compress the geometric information of at least one section of the sections according to a predefined compression scheme, and generate at least one of files 120 corresponding to the section including the spatially compressed geometric information and one or more parameters of the predefined compression scheme.

In some embodiments, the one or more parameters of the predefined compression scheme may include a bit-size, denoted C, of a compressed coordinate, which is less than a bit-size, denoted N, of a coordinate of the CAD model, e.g., as described below. In other embodiments the parameters may include, additionally and/or alternatively, any other suitable parameters.

In some embodiments, compression server 114 may determine the integer bit-size N required to store a coordinate in the CAD model, for example, based on the extents of the CAD model. In some embodiments, compression server 114 may determine the integer bit-size N in a section-specific manner, by determining the integer bit-size N required to store a coordinate in a certain section, for example, based on the extents of the section. In one embodiment, compression server 114 may determine the bit-size N, for example, by determining the integer value satisfying the following condition:

$N \geq \log_2(\text{Max}(\text{Abs}(\text{extents.left}), \text{Abs}(\text{extents.bottom}),$ $\text{Abs}(\text{extents.right}), \text{Abs}(\text{extents.top})))$ and $N \leq \log_2(\text{Max}(\text{Abs}(\text{extents.left}), \text{Abs}(\text{extents.bottom}),$ $\text{Abs}(\text{extents.right}), \text{Abs}(\text{extents.top})))+1$  (5)

wherein extents.left, extents.bottom, extents.right, and extents.top denote the left, bottom, right and top extent values of the CAD model, respectively, e.g., if the bit-size N is determined for the CAD model; or wherein extents.left, extents.bottom, extents.right, and extents.top denote the left, bottom, right and top extent values of the certain section, respectively, e.g., if the bit-size N is determined for the certain section. The values of extents.left, extents.bottom, extents.right, and extents.top corresponding to the CAD drawing may be included, for example, as part of header 183 corresponding to the CAD drawing. The values of extents.left, extents.bottom, extents.right, and extents.top corresponding to the certain section may be included, for example, as part of dependencies file 171 in association with the data corresponding to the certain section. In other embodiments, the compression server 114 may determine the bit-size N according to any other suitable criterion and/or condition. For example, in one embodiment compression server 114 may determine the bit-size N by shifting the entire CAD drawing such that the CAD drawing includes only positive values, and then determining the value of N based on the positive values, e.g., without the need to use negative values.

In some embodiments, compression server 114 may apply any suitable "file" or "data" compression algorithm, e.g., the ZLib compression algorithm and/or any other algorithm, to further compress files 120, e.g., after performing the spatial compression.

Figure 5:
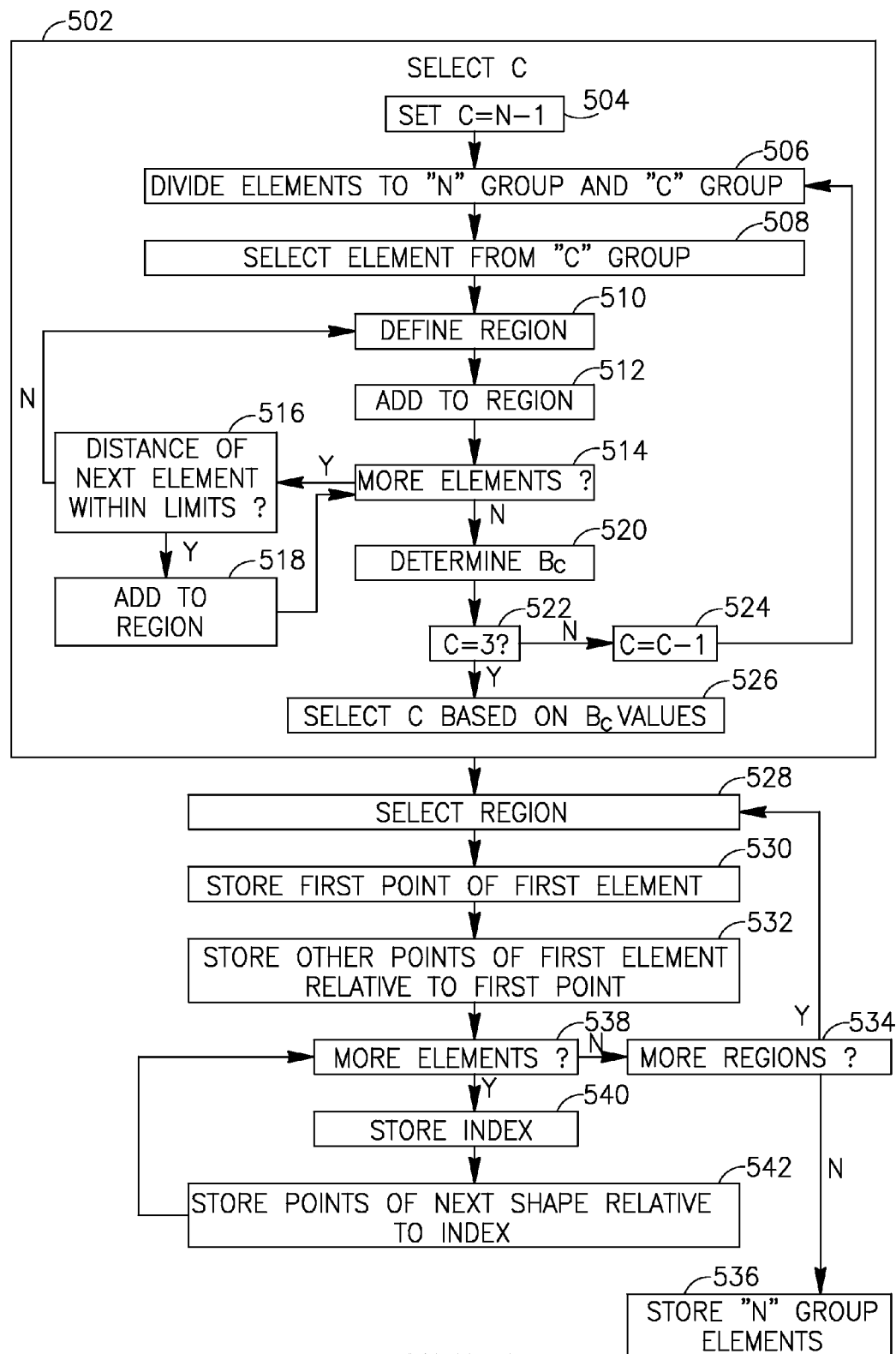
FIG. 5 is a schematic flow-chart illustration of a method of spatially compressing geometric information of one or more geometric elements of a geometric section, in accordance with some demonstrative embodiments.

Reference is also made to FIG. 5, which schematically illustrates a method of spatially compressing geometric information of one or more geometric elements of a geometric section, in accordance with some demonstrative embodiments. In some embodiments, one or more operations of the method of FIG. 5 may be implemented by a server, e.g., compression server 114 (FIG. 1), e.g., to spatially compress coordinate values of geometric elements corresponding to a geometric section.

As indicated at block 502, the method may include determining the value of the bit-size C for representing a compressed coordinate such that N>C, e.g., as described below.

The term "distance" as used below with reference to two points may be defined a the maximum of the differences between respective coordinates of the points. For example, the distance, denoted $D_{(x1,y1),(x2,y2)}$, between two 2D points, denoted (x1,y1) and (x2,y2), may be defined as follows:

$D_{(x1,y1),(x2,y2)}=\text{Max}(\text{Abs}(x1-x2),\text{Abs}(y1-y2))$  (6)

As indicated at block 504, the method may include setting the value of C to a predefined initial value, e.g., N−1.

As indicated at block 506, the method may include dividing the geometric elements of the section into two groups of elements, for example, a first group ("the "N" group") including geometric elements having coordinates, which may be stored using the "fill size" N-bit values; and a second group ("the "C" group") including geometric elements having coordinates, which may be stored using C-bit values. For example, a geometric element may be included in the C group if both a width and a height of the bounding rectangle of the geometric element are less than 2^C.

In some embodiments, the method may include dividing the geometric elements of the "C" group into one or more regions such that, for example, for each region, the distance between each vertex of each geometric element and a point on a bounding rectangle of a neighbor geometric element in the region is less than 2^C, e.g., as described below.

A indicated at block 508, the method may include selecting a geometric element ("the current geometric element") from the "C" group of geometric elements.

In some embodiments, the geometric elements in the section may be sorted, for example, according to the value of a predefined coordinate of each of the geometric elements. In one embodiment, geometric elements in the section may be sorted by the x coordinate of the bottom-left corner of the bounding rectangle of each geometric element, e.g., from the geometric element having the lowest x coordinate value to the geometric element having the highest x coordinate value. In other embodiment, the geometric elements may be sorted according to any other suitable coordinate value.

In some embodiments, selecting the geometric element may include selecting the first geometric element of the sorted geometric elements, e.g., the geometric element having the bounding rectangle with the lowest x coordinate value.

As indicated at block 510, the method may include defining a region, e.g., by assigning a region identifier to the defined region.

As indicated at block 512, the method may include adding the current geometric element to the region.

As indicated at block 514, the method may include determining whether or not there are additional geometric elements in the "C" group, which have not been assigned to any region. For example, the method may include determining whether or not the sorted geometric elements belonging to the "C" group includes a next geometric element.

As indicated at block 516, the method may include determining whether or not the distance between the bottom-left corner of the next geometric element and an index point, e.g., as described below, on the bounding rectangle of the current geometric element is less than $2^C$. The method may include defining another region, as indicated at block 510, and adding the next geometric element to the other region, as described above with reference to bock 512, e.g., if the distance between the bottom-left corner of the next geometric element and the index point on the bounding rectangle of the current geometric element is equal to or greater than $2^C$.

As indicated at block 518, the method may include adding the next geometric element to the region. The method may include setting the next geometric element as the "current" geometric element and repeating the operations of blocks 514 and 516 for one or more additional geometric elements.

As indicated at block 520, the method may include determining a data bit-size, denoted $B_C$, required for storing the coordinates of the geometric elements using the value of C. For example, the value of $B_C$ may be determined as follows:

$$B_C = N*2*(\text{\# vertices in ``}N\text{'' group}) + \quad (7)$$
$$N*2*(\text{\# regions}) + +C*2*((\text{\# vertices in ``}C\text{'' group}) - \text{\# regions})$$

In some embodiments, at least three bits may be required to store ten different integer values which may be assigned to the coordinates of the geometric elements, e.g., the integer values between zero and nine. Accordingly, as indicated at blocks 522 and 524, the method may include decreasing the value of C by one, e.g., if C is greater than three. The method may include repeating the operations of blocks 506, 508, 510, 512, 514, 516, 518 and/or 520 with relation to one or more additional values of C, e.g., until C is equal to three.

As indicated at block 526, the method may include selecting the value of C based on the values of $B_C$. For example, the method may include, selecting the value of C resulting in the lowest value of $B_C$. The selected value of C may be stored, for example, in association with the section, e.g., as part of dependencies file 171.

In some embodiments, the operations of blocks 506, 508, 510, 512, 514, 516, 518, 520, 522, 524 and/or 526 may result in an array of one or more regions including all geometric elements of the selected "C" group, wherein each region includes an array of one or more sorted geometric elements.

In some embodiments, the method may include iterating over each of the regions defined according to the selected value of C and, for each region, spatially compressing the coordinates of the geometric elements included in the region, e.g., as described below.

As indicated at block 528, the method may include selecting a region of the regions defined according to the selected value of C. For example, the first region may be selected.

As indicated at block 530, the method may include storing the coordinates of the first point, denoted $(x^1_1, y^1_1)$, of the first geometric element in the selected region. For example, each of the coordinates of the first point of the first geometric element may be stored in "full-size", e.g., using up to N bits.

As indicated at block 532, the method may include storing one or more relative distance values representing the distances between one or more other points of the first geometric element, e.g., the coordinates of all other points of the first geometric element, relative to the coordinates of the first point. For example, the coordinates of a j-th point of the first geometric element, denoted $(x^1_j, y^1_j)$, wherein j>1, may be represented by the distance, denoted $d_j$, as follows:

$$d_j = (x^1_1 - x^1_j, y^1_1 - y^1_j) \quad (8)$$

As discussed above, by definition:

$$d_j < 2^C \quad (9)$$

Accordingly, the distance $d_j$ may be represented by up to C bits. Therefore, representing the coordinates of the j-th point by the distance $d_j$ may enable representing the coordinates of the j-th point using only up to C bits, e.g., instead of using the "full size" N-bit representation of the coordinates of the point.

As indicated at block 538, the method may include determining whether or not there are additional geometric elements to be processed in the selected region.

As indicated at block 540, the method may include storing an index representing a reference point on the bounding rectangle of the first geometric element, e.g., if it is determined that there is at least one more additional geometric element in the selected region. The reference point may include, for example, a point selected from a set of predefined points based on a distance between each of the predefined points and the additional geometric element.

In one embodiment, the predefined set of points may include four points, e.g., an upper right corner of the bounding rectangle of the first geometric element, an upper left corner of the bounding rectangle of the first geometric element, a lower right corner of the bounding rectangle of the first geometric element, and a lower left corner of the bounding rectangle of the first geometric element. In other embodiments, the predefined points may include any other points corresponding to the bounding rectangle of the first geometric element.

The reference point may include a point of the predefined set of points having the least distance from the lower left point of the bounding rectangle of the additional geometric element and/or any other point corresponding to the additional geometric element. The index may be represented by a number of bits corresponding to the number of the predefined points. For example, the index may be represented by a two-bit number, e.g., if the set of reference points includes four points.

As indicated at block 542, the method may include storing one or more relative distance values representing the distances between one or more points of the additional geometric element, e.g., the coordinates of all other points of the additional geometric element, relative to the coordinates of the reference point, e.g., as described above with reference to block 532. Accordingly, representing the coordinates of the points of the additional geometric element by the relative distances may enable representing the coordinates of the point of the additional geometric element using only a C-bit value, e.g., instead of using the "full size" N-bit representation of the coordinates of each point.

As indicated at block 534, the method may include determining whether or not there are additional regions to be processed. The method may include repeating the operations described above with reference to blocks 528, 530, 532, 538, 540 and/or 542 with relation to one or more additional regions.

As indicated at block 536, the method may include storing geometric data of the geometric elements belonging to the "N" group using the full N-bit data size needed to represent the coordinates, e.g., using up to N bits to represent each coordinate.

In some embodiments, rough geometry file 173 (FIG. 1) corresponding to a section may include a plurality of N-bit values corresponding to a plurality of respective coordinates in the section. As described above, the spatial compression may allow storing one or more coordinates, e.g., the rough geometry data of the coordinates, using a bit size of C. Accordingly, the N-bit values representing different coordinates of the section may have different degrees of precision. For example, the N-bit values representing in "full size" the first point in the region may have a first degree of precision. The j-th point in the region may be represented by the distance $d_j$ at the same first degree of precision using only C<N bits. Accordingly the N-bit value of file 173 (FIG. 1) representing a coordinate of the j-th point may include C bits representing the coordinate at the first degree of precision, and the remaining N-C bits may store additional precision data of the coordinate. Therefore, the N-bit value may represent the coordinate of the j-th point at a second degree of precision, which may be greater than the first degree of precision.

In some embodiments, utilizing one or more operations of the method described above with reference to FIG. 5 to spatially compress the geometric data of a CAD model may result in utilizing a number of bits which is, for example, up to forty percent, or even fifty percent less than a number of bits required for storing, at the same degree of precision, the coordinates of the CAD model in "full size". Such spatial compression may be essentially lossless since, as described above, the resulting "compressed" data may include the required information, e.g., in the form of the relative distance values, for extracting the full size coordinates of all point of the CAD model.

Figure 6:
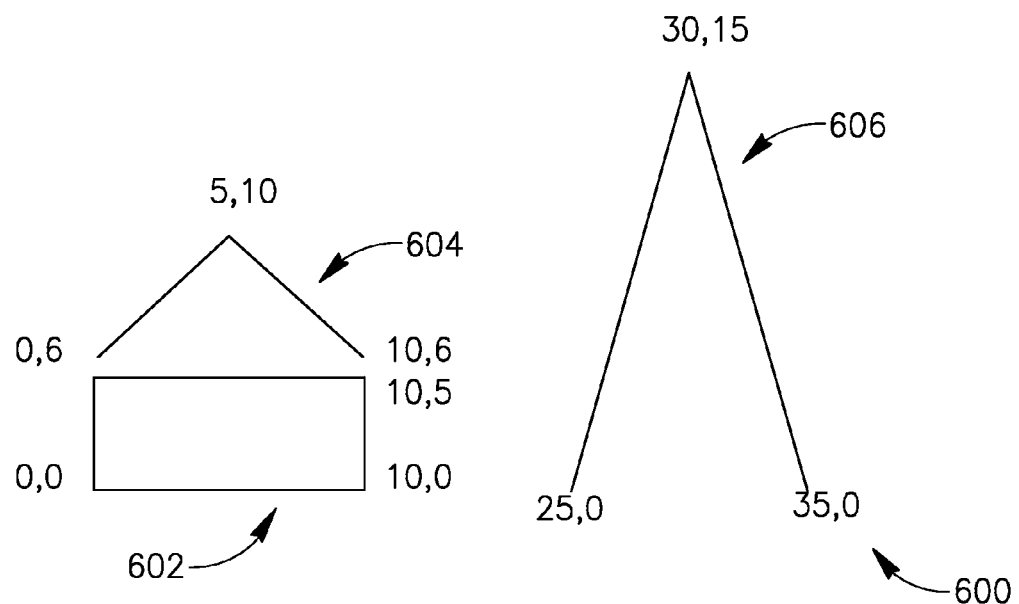
FIG. 6 is a schematic illustration of a two-dimensional model, in accordance with one demonstrative embodiment.

FIG. 6 schematically illustrates a demonstrative 2D model 600. In accordance with one demonstrative embodiment, the extents of model 600 span between the values of 0 and 35 on the x-axis, and between 0 and 15 on the y-axis.

As shown in FIG. 6, model 600 may include three geometric shapes 602, 604 and 606 defined by ten points, wherein each point is defined by two integer coordinates. Therefore, the number N of bits required for representing, in "full size", the coordinates of model 600 may be determined to be equal to six, e.g., according to Condition 5. Accordingly, storing all coordinates of model 600 may require 2*6*10=120 bits.

The value of C may be selected from the values between C=N−1=5 and C=3, e.g., as described above. The value C=5 may be initially selected, e.g., as described above with reference to block 504 of FIG. 5. Geometric elements 602, 604 and 606 may be all included within the "C" group and may all be included within a single region. Accordingly, a first point of the ten points, e.g., the point (0,0) of geometric element 602, may be stored in "full size" using up to 2*6=12 bits, while all other nine points may be stored using 5*2*9=90 bits to represent nine respective relative distances, e.g., as described above. Accordingly, a total of up to $B_5$=12+90=102 bits may be required to store the coordinates of model 600 if C=5.

The value of C=4 may then be selected. Accordingly, the three geometric elements of model 600 may be all included within the "C" group and may be distributed to two regions, e.g., since $2^C$=16. The first region will include geometric elements 602 and 604, while the second region will include geometric element 606. As a result, a total of up to $B_4$=2*6*2+4*2*(10−2)=24+8*8=88 bits may be required to store the coordinates of model 600 if C=4.

The value of C=3 may then be selected. Accordingly, geometric elements 602 and 606 may determined to belong to the "N" group, e.g., since the bounding box of geometric elements 602 and 606 may have a width and/or height greater than $2^3$=8. Geometric element 604 may be included in a single region. As a result, a total of up to $B_3$=2*6*7+2*6*1+3*2*(3−1)=84+12+12=108 bits may be required to store the coordinates of model 600 if C=3.

The value of C may be selected as the value resulting in the minimal value of $B_C$, e.g., as described above with reference to block 526 of FIG. 5. Accordingly the value of C=4 may be selected, and the coordinates of model 600 may be stored using only up to 88 bits, e.g., compared to the 120 bits required for storing the coordinates in full 6-bit size.

Referring back to FIG. 1, in some embodiments the functionality of client application 104 may be performed by a full streaming/rendering/editing Object-Oriented-Programming (OOP) application. Client applications 104 and/or 106 may be or may be implemented as part of, or within, a web browser running a virtual machine and/or a programmable web browser plug-in such as, for example, Adobe Flash Player, e.g., with the Actionscript Virtual Machine, Microsoft Silverlight, e.g., the MS Common language runtime, and the like.

In some embodiments, client applications 104 and/or 106 may result from processor 130 executing instructions stored by memory 131 and/or storage 132.

In some embodiments, client applications 140 and/or 106 may result from processor 130 executing instructions received from a server, for example, instructions streamed from CAD server 112 to stations 102 and/or 108 via communication network 110. For example, CAD server 112 may stream byte-code to station 102, after authenticating the user of station 102, e.g., using any suitable authentication method. The byte-code including the functionality of client application 104 may be downloaded, e.g., dynamically, by station 102 from application server 116, e.g., via communication network 110.

In one embodiment, CAD server 112 may stream to station 102 the byte-code required for initial loading of client application 104. CAD server 102 may transfer to station 102 further byte-code, e.g., including additional features of client application 104 based, for example, on demand and/or permissions of the user of station 102, e.g., byte-code enabling the editing of the CAD model may not be transferred to station 102, if the user does not have permissions to edit the CAD model.

In some embodiments, client application 104 may be capable of rendering to the user of station 102 a viewport including at least a portion of a CAD model based on data received from CAD server 112. The CAD model may include, for example, the CAD model processed by CAD server 112 as described above.

In some embodiments, client application 104 may be capable of requesting data corresponding to the CAD model from CAD server 112; receiving ("downloading") the data from CAD server 112; processing ("reading") the received data; and/or rendering one or more portions to the user of station 102 via output unit 134.

In some embodiments, client application 104 may request from CAD server 112 dependencies file 171 and/or the style-object information corresponding to the CAD model. In one embodiment, client application 104 may request from CAD server 112 the header file 183 associated with the CAD model, e.g., as described above.

In some embodiments, client application 104 may utilize dependencies file 171 to define the plurality of geometric sections of the CAD model, which may be defined by a plurality of respective boundaries, and identified by a plurality of respective identifiers. For example, dependencies file 171 may define the number and/or arrangement of levels and/or sections within one or more pyramid structures, e.g., as described above with reference to FIGS. 3A and 3B.

In some embodiments, the distribution of the plurality of geometric elements of the CAD model to the plurality of geometric sections, e.g., as described above, may allow client application 104 to make limited, exact and/or precise requests for one or more portions of the CAD model, e.g., according to the current position of the user viewport.

Additionally or alternatively, the distribution of the plurality of geometric elements of the CAD model to the plurality of geometric sections may allow client application 104 to perform, in parallel, operations relating to different geometric sections. For example, client application 104 may request one or more of files 120 relating to one or more sections, in parallel to receiving one or more of files 120 relating to one or more sections, in parallel to reading one or more of files 120 relating to one or more sections, and/or in parallel to rendering to the user geometric elements of one or more sections. Accordingly, client application 104 may allow the user of station 102 to view and/or edit one or more portions of the CAD model, for example, while data of the one or more portions and/or data of one or more other portions have not yet been requested, received and/or read by client application 104.

In some embodiments, client application 104 may select at least one section of the plurality of sections, for example, based on a relationship between the viewport and the boundaries of the plurality of geometric sections; and request from CAD server 102 one or more of files 120 corresponding to the at least one selected section, e.g., as described below. In some embodiments, client application 104 may re-select one or more sections, for example, upon a change in the setting of the viewport, e.g., each time the viewport is set by the user of station 102 and/or by any other element system 100.

In one embodiment, the viewport may include the extents of the CAD drawing. Accordingly, client application 104 may request from CAD server 112 four files 120, including the leading points file 175, the rough geometry file 173, the precision geometry file 177, and the metadata file 179, corresponding to the largest section, e.g., section zero of level zero as described above with reference top FIGS. 3A and 3B; as well as only the leading points files 175 of all other sections, e.g., since, as described above, rendering each of the geometric elements of the other sections may require no more than 4×4 pixels in the viewport, therefore each of the geometric elements may be displayed using a single pixel.

In another embodiment, the viewport may include a portion of the extents of the CAD drawing. According to this embodiment, client application 104 may request files 120, including the leading points file 175, the rough geometry file 173, the precision geometry file 177, and the metadata file 179, of one or more sections including and/or intersecting with the viewport.

In yet another embodiment, the viewport may include a geometric element being edited by the user of station 102. According to this embodiment, client application 104 may request files 120 including the metadata of only the geometric element being edited, e.g., while not requiring the metadata relating to other geometric elements.

In some embodiments, for each section of the geometric sections client application 104 may determine whether the viewport intersects with the boundary of the section. Client application 104 may select the section, for example, if it is determined that the viewport intersects with the boundary of the section.

In some embodiments, client application 104 may request from CAD server 112 files 120 including at least the rough geometry data 173 corresponding to the selected sections, for example, if such files have not been previously requested. In some embodiments, client application 104 may request from CAD server 112 files 120 including any other suitable data. For example, in one embodiment client application 104 may request from CAD server 112 files 120 including also leading points data 175 corresponding to the selected sections, for example, if such files have not been previously requested. In another embodiment, client application 104 may not request leading points data 175, for example, if the selected sections are to be rendered at a relatively high "zoom-factor".

In some embodiments, client application 104 may also selectively request from CAD server 112 files 120 including the precision-geometry data 177 corresponding to the selected sections, for example, based on a dimension of the viewport, e.g., if such files have not been previously requested.

In one embodiment, client application 104 may also selectively request from CAD server 112 files 120 including the precision-geometry data 177 corresponding to the selected sections if, for example, a ratio between a width of the viewport and a display width for displaying the viewport is less than a resolution of the display, e.g., output unit 134 (FIG. 1).

Figure 7:
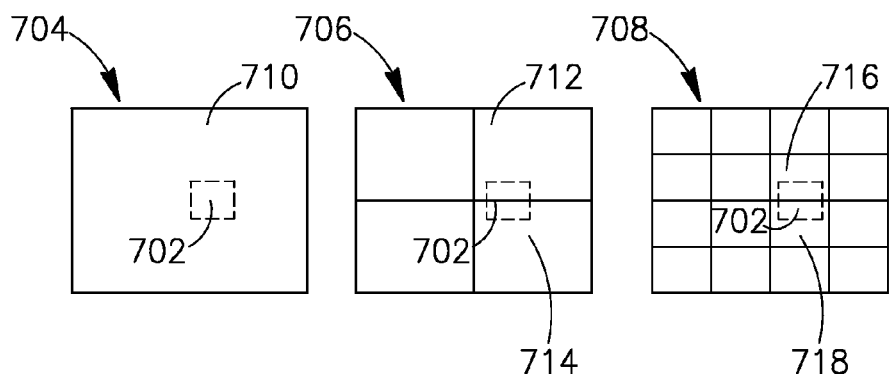
FIG. 7 is a schematic illustration of a viewport with relation to geometric sections of a pyramid structure, in accordance with one demonstrative embodiment.

Reference is also made to FIG. 7., which schematically illustrates a viewport 702 with relation to geometric sections of a pyramid structure including twenty-one geometric sections arranged in three levels 704, 706, and 708, in accordance with one demonstrative embodiment.

As shown in FIG. 7, viewport 702 intersects with the single section 710 of level 704, with sections 712 and 714 of level 706, and with sections 716 and 718 of level 708. Accordingly, client application 104 may request from CAD server 112 files 120 corresponding to five sections, namely, sections 710, 712, 714, 716 and 718, for example, while not requesting files 120 corresponding to the other sixteen sections of the pyramid structure.

In some embodiments, client application 104 may request from CAD server 112 files 120 corresponding to the selected sections by sending to CAD server 112, substantially simultaneously, a plurality of requests via two or more available communication channels over network 110. In other embodiments, client application 104 may send the requests to CAD server 112 over a single communication channel.

In some embodiments, client application 104 may implement any suitable load-balancing algorithm to distribute the plurality of requests to the two or more communication channels.

In some embodiments, client application 104 may distribute the requests to the communication channels based on the estimated data size of the selected sections. For example, client application 104 may extract from dependencies file 171 the estimated data sizes of the selected sections, e.g., as described above with reference to Equation 4. Client application 104 may then distribute the plurality of requests to the communication channels based on the data sizes of the selected sections. For example, client application 104 may iterate over the selected sections and, for each selected section, client application 104 may add the request, for files 120 corresponding to the section, to a communication channel having a predicted lowest amount of data to be transferred in response to the request, e.g., such that each communication channel will have substantially the same predicted amount of data to transfer in response to the request.

In some embodiments, client application 104 may perform a read operation to read received files 120 and to reconstruct the geometric elements of a section represented by the data of the received files. For example, when "reading" a section, client application 104 may perform a process which may be reverse to the process performed by application server 116 when generating files 120 based on the CAD model, e.g., as described above. For example, client application 104 may determine the value of C corresponding to the section, e.g., based on dependencies file 171, e.g., as described above. Client application 104 may then utilize the value of C to extract and decompress the data, e.g., the shapes and vertices, of the geometric elements belonging to the section. Client application 104 may then store the decompressed data, for example, in a pyramid like data structure similar to the pyramid structure described above with reference to FIGS. 3A and 3B. For example, client application 104 may store the decompressed data in memory 131 and/or in any other memory or storage.

In some embodiments, for each file 120 received from CAD server 112, client application 104 may progressively read the data of each region and/or section, and combine the data with data of previously received layers for the region and/or section. For example, client application may receive precision geometry file 177 corresponding to a section after receiving leading point file 171 and rough geometry file 173 corresponding to the section. Client application 104 may then combine the precision geometry data with the previously received rough geometry data.

In some embodiments, client application 104 may include a single threaded application, e.g., client application 104 may be able to execute only a single "code" or instruction at a time. In other embodiments, client application 104 may include a multi-threaded application, e.g., client application 104 may be able to execute more than one "code" or instruction at a time.

In some embodiments, the distribution of the plurality of geometric elements of the CAD model to the plurality of geometric sections may allow client application 104, e.g., even the single threaded client application, to perform, in parallel, two or more tasks or operations with relation to the CAD model.

In one embodiment, client application 104 may be able to "download", e.g., by requesting and/or receiving, files 120 corresponding to different geometric sections via multiple communication channels, since, for example, the files 120 corresponding to different sections may be independent of one another, e.g., as described above.

In another embodiment, client application 104 may simultaneously handle a plurality of sections, e.g., by simultaneously selecting, downloading, reading, rendering, and/or editing the plurality of sections substantially simultaneously.

In another embodiment, client application 104 may simultaneously perform a plurality of operations on a section, e.g., read the data of the geometric elements of the section, edit the geometric elements, download the data of the geometric elements, and the like.

In some embodiments, client application 104 may include a task manager 167 to manage, according to a multitasking scheme, a plurality of operations for rendering the CAD model. For example, task manager 167 may wrap the plurality of operations by a plurality of respective task objects ("tasks"), and assign the tasks to a plurality of execution queues according to any suitable queuing scheme, for example, according to a priority of the tasks.

In some embodiments, task manager 167 may utilize the task objects to provide interface for activating, pausing, and/or canceling the performance of the plurality of operations. Task manager 167 may be responsible of activating, stopping, pausing and/or canceling the execution of the tasks. For example, task manager 167 may assign each task with a time interval to run. The task may check whether the time to run elapsed at critical locations defined by the task. When the running time has elapsed, task manager 167 may decide, for example, whether to run another task, e.g., having a lower priority, or to wait for a next time interval, thereby to release client application 104 to perform any other suitable operations, for example, to execute graphical and/or user interface code.

In one embodiment, the tasks may be assigned with three levels of priority, namely top priority, middle priority, and low priority. Task manager 167 may manage the tasks such that the top priority queued tasks are run for a first predefined portion of the time interval, e.g., 80% of the time interval; the middle priority queued tasks run for a second predefined portion of the time interval, e.g., 20% of the time interval; and the low priority queued tasks run when there are no other tasks in any of the top priority and middle priority queues. In one example, when client application 104 is to "open" the CAD model, client application 104 may assign the reading operation, for reading sections of the CAD model, to the top priority queue. Client application 104 may also assign a rendering ("painting") operation, for rendering already-read sections, to the middle priority queue. Client application 104 may assign to the low priority queue other tasks, for example, tasks regarding the editing of the CAD model, e.g., snapping and/or selecting operations. In other embodiments, client application 104 and/or task manager 167 may the assign priorities, queue and/or manage the tasks according to any other suitable scheme.

In some embodiments, client application 104 and/or application server 116 may be capable of performing one or more "delayed editing operations" with respect to the CAD model. For example, client application 104 and/or application server 116 may be capable of storing editing information of one or more editing operations performed by the user of station 102 with relation to one or more geometric elements ("the edited geometric element") of the CAD model; and later using the stored editing information to update the CAD model in a delayed manner, for example, by applying the editing operations to one or more of the leading point data, the rough geometry data, the precision data and/or the metadata of the CAD model, e.g., as described below.

In some embodiments, the editing operation may include, for example, adding at least one new geometric element to the CAD model; translating, moving, rotating, and/or scaling at least one geometric element of the CAD model; repositioning a polyline vertex; editing as text value; adding deleting, and/or modifying metadata, and the like.

In some embodiments, client application 104 may "encapsulate" by a command object 193 an editing operation performed by the user of station 102. In one embodiment, command object 193 may include editing information representing the editing "intention" of the user, e.g., instead of the actual result of the editing operation. For example, when the user moves a shape using the mouse, client application 104 may generate command object 193 including information representing coordinates and/or actions performed by the user with respect to the mouse, e.g., translations and/or mouse clicks performed by the user, instead of, for example, information regarding the coordinates of the shape that was moved or by how much it was moved on the screen. Accordingly, the editing information of command object 193 may represent the editing operation as viewed by the user, for example, with respect to the edited geometric element as rendered to the user on the screen.

In some embodiments, client application 104 may store command object 193 locally on station 102, and/or provide command object 193 to application server 116, which in turn may store command object 193 on storage 118 and/or provide command object 193 to a client application of another station, e.g., client application 106 of station 108, as described below.

In some embodiments, command object 193 may be stored in association with one or more geometric sections ("the affected sections") corresponding to the edited geometric element. In one embodiment, client application 104 may execute command object 193 to apply the editing operation to the CAD model, for example, upon receiving data corresponding to the affected geometric sections, e.g., upon receiving precision data corresponding to the affected geometric sections.

In one embodiment, client application 104 my serialize command object 193 to application server 116, which may store command object 193 on storage 118, and later provide command object 193 to client application 106. According to this embodiment, the editing of the CAD model may be coordinated by client applications 104 and 106 via application server 116, such that the users of stations 102 and 103 may edit a common CAD model, for example, without causing conflicts between the editing operations of the users of stations 102 and 103. For example, when the user of station 102 performs first editing operations to edit a first portion of the common CAD model, client application 104 may render the first editing operations to the user of station 102, while providing to application server 116 one or more command objects corresponding to the first editing operations. When the user of station 108 performs second editing operations to edit a second portion of the common CAD model, client application 106 may render the second editing operations to the user of station 108, while providing to application server 116 one or more command objects corresponding to the second editing operations. When rendering the CAD model to the users of stations 102 and 108, client applications 104 and 106, respectively, may execute the command objects to render the CAD model based on the first and second editing operations.

In another embodiment, client application 104 and/or application server 116 may disseminate command object 193 to other users, e.g., to enable real time co-editing of the CAD model. In another embodiment, client application 104 and/or application server 116 may send command object 193 to other users to be reviewed asynchronously.

In another embodiment, command object 193 may be executed to apply the editing operation to another CAD model.

In some embodiments, client application 104 and/or application server 106 may execute command object 193 to apply the editing operation to the CAD model, and/or "un-execute" command object 193, e.g., to undo the editing operation.

In one embodiment, client application 104 and/or client application 106 may execute and/or un-execute a set of command objects 193 corresponding to a set of editing operations performed to the CAD model by one or more users of one or more stations. The set of editing operations may include, for example, one or more sequences of operations performed by the users. For example, the user of station 102 may perform a first sequence of editing operations with respect to the CAD model, while the user of station 108 may perform a second sequence of editing operations with respect to the CAD model. Application server 116 may receive, for example, a first set of command objects 193 from client application 104; and a second set of command objects 193 from client application 106. Application server 116 may store the command objects 193 of the first and second sets, e.g., in association with the CAD drawing. Application server 116 may provide command objects 193 of the first and second sets to client application 104 and/or client application 106, e.g., upon receiving a request to provide data corresponding to the CAD drawing. Client application 104 and/or client application 106 may execute and/or un-execute the command objects 193 in any suitable manner and/or order, e.g., to apply the editing operations to files 171 173, 175, 177 and/or 179 corresponding to the CAD model. In one example, client application 104 and/or client application 106 may execute command objects 193 in an order corresponding to a time at which command objects 193 were generated, e.g., from the newest command object to the oldest command object. In another example, client application 104 and/or client application 106 may execute command objects 193 based on editing priorities assigned to the users of stations 102 and 108. For example, the user of station 102 may be assigned with a first editing priority, which is greater than a second editing priority assigned to the user of station 108, e.g., if the user of station is a project manager and the user of station 108 is an engineer. According to this example, client application 104 and/or client application 106 may execute the command objects 193 generated by client application 104, while un-executing one or more of the command objects 193 generated by client application 108, which contradict the command objects 193 generated by client application 104.

In some embodiments, client application 104 may allow the user of station 102 to perform one or more editing operations with relation to one or more portions of the CAD model, for example, even prior to downloading, reading and/or rendering one or more details of the CAD model. For example, client application 104 may render to the user of station 102 one or more portions of the CAD model at a first degree of detail or resolution, e.g., prior to downloading and/or reading all the information related to the rendered portions.

In one example, client application 104 may render to the user of station 102 the portions based on the leading point data and/or rough geometry data of one or more sections corresponding to the rendered portions, e.g., prior to downloading and/or reading the precision data and/or metadata. Upon identifying an editing operation to the rendered portion, client application 104 may apply the editing operation to the rendered portion, while storing a command object corresponding to the editing operation, e.g., in association with the sections affected by the editing operation. Client application 104 may later execute the command object, e.g., upon receiving the precision data corresponding to the affected sections, to thereby apply the editing operation to the precision data.

In another example, client application 104 may render the CAD model to the user of station 102 from a "far" perspective, e.g., such that some or most of the geometric elements are rendered as single pixels. For example, client application 104 may render the geometric elements based on the leading point data of the geometric elements, e.g., even prior to receiving and/or reading other data corresponding to the geometric elements. The user of station 102 may decide, for example, to move all the geometric elements. Accordingly, the user may perform a selection operation to select all the geometric elements, and a translation operation to move the selected geometric elements. In response, client application 104 may translate the leading points of the geometric elements, and render to the user of station 102 the translated leading points. Client application 104 may generate and cache command objects 193 to represent the translation of the geometric elements. The user may then decide to zoom-in on a selected portion of the CAD model, where more detailed data may be required. In response, client application 104 may read the required data, e.g., the rough geometry data, the precision data and/or the metadata corresponding to the selected portion, and execute all the command objects 193, which are associated with the sections corresponding to the selected portion. As a result, the geometric elements of the selected portion may be translated according to the translation performed by the user with respect to the leading points.

Figure 8:
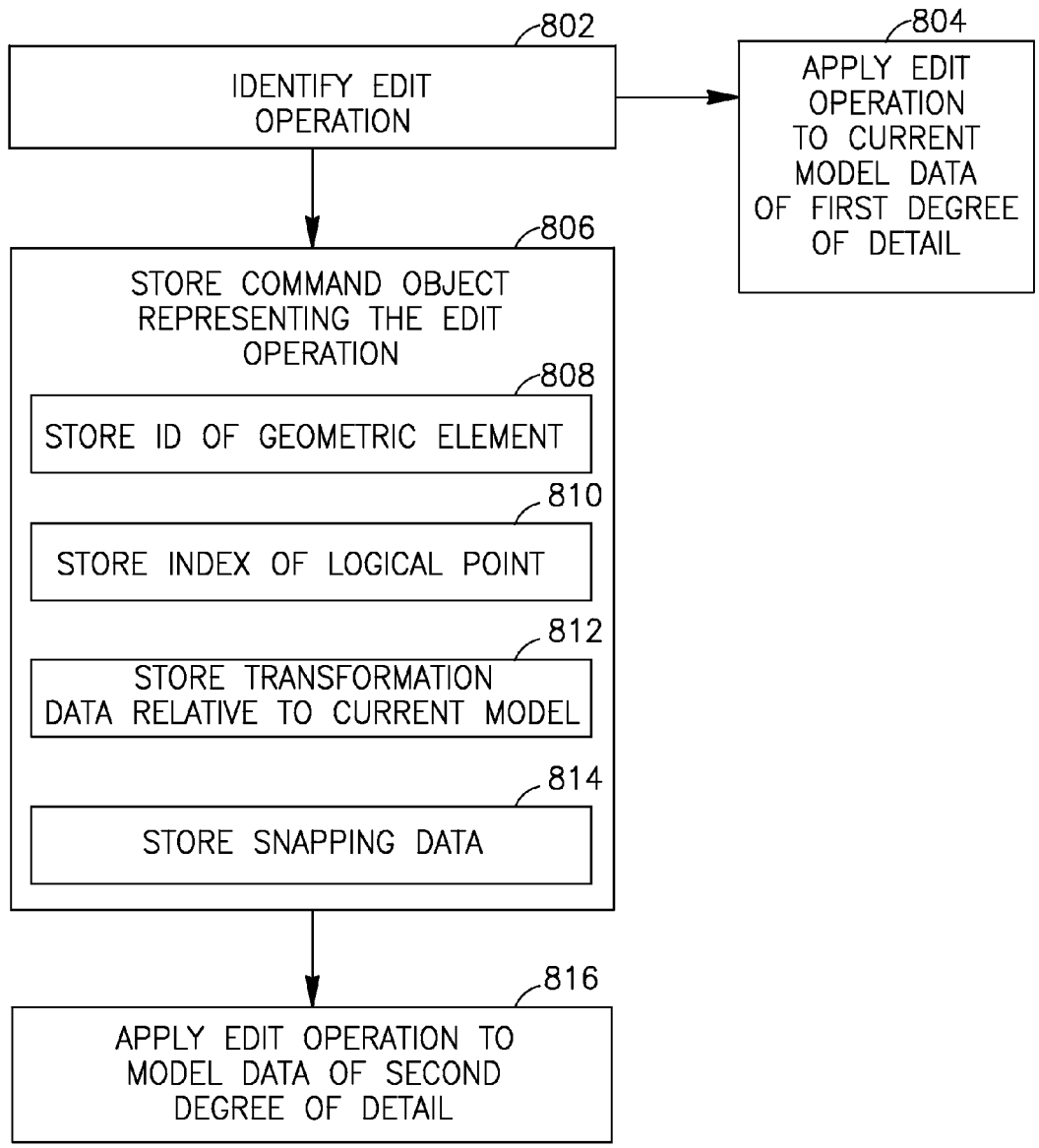
FIG. 8 is a schematic flow-chart illustration of a method of delayed updating of a CAD model, in accordance with some demonstrative embodiments.

Reference is now made to FIG. 8, which schematically illustrates a method of delayed updating of a CAD model, in accordance with some demonstrative embodiments. In some embodiments, one or more operations of the method of FIG. 8 may be implemented by a client application, e.g., client application 104 (FIG. 1), for example, to identify an editing operation, which is performed with relation to at least one geometric element of a CAD model, e.g., at a first degree of detail; and to apply the edit operation to the CAD model, e.g., at a second degree of detail, which is greater than the first degree of detail.

As indicated at block 802, the method may include identifying an editing operation to edit at least one geometric element of the CAD model. For example, client application 104 (FIG. 1) may identify an editing operation performed by the user of station 102 (FIG. 1) to edit the geometric element. The geometric element may be rendered to the user at a first degree of detail, based on first model data having the first degree of detail, e.g., the leading point data and/or the rough geometry data as are described above. In one embodiment, the geometric element may be rendered to the user based only on the leading point data and/or the rough geometry data, e.g., prior to receiving, reading and/or rendering the precision data and/or the metadata corresponding to the geometric element.

As indicated at block 804, the method may include applying the editing operation to the geometric element at the first degree of detail. For example, client application 104 (FIG. 1) may revise the first model data based on the editing operation. Accordingly, the editing operation may be rendered to the user of station 102 (FIG. 1) with respect to the geometric element at the first degree of detail, e.g., as described below with reference to FIG. 9.

As indicated at block 806, the method may include storing at least one command object representing the editing operation. For example, client application 104 (FIG. 1) may generate at least one command object 193 (FIG. 1) including editing information of the editing operation.

As indicated at block 808, storing the command object may include storing an identifier of the edited geometric element. For example, command object 193 (FIG. 1) may include any suitable identifier to identify the edited geometric element, e.g., uniquely.

As indicated at block 810, storing the command object may include storing point-indication information indicating a logical point of the geometric element to which the editing operation was applied. The point-indication information may logically identify the point, e.g., without referring to the specific coordinates of the point. For example, command object 193 (FIG. 1) may include an index indicating the logical point of the edited geometric element, e.g., as described below. For example, if the editing operation includes moving a right end point of a line, then the logical point may include, for example, information, e.g., in the form of a predefined index value, indicating that the editing operation was performed with respect to the right end point of the line.

As indicated at block 812, storing the command object may include storing transformation data of the editing operation at the first degree of detail. For example, command object 193 (FIG. 1) may include transformation information representing a transformation of the edited geometric element at the first degree of detail, e.g., as described below with reference to FIG. 9. The transformation information may include, for example, delta-x and/or delta-y values, e.g., if the transformation includes a translation; a delta-angle value, e.g., if the transformation includes a rotation; scale-x and/or scale-y values, e.g., if the transformation includes scaling, and the like.

As indicated at block 814, storing the command object may include storing snapping data of the editing operation at the first degree of detail, e.g., if the editing operation includes a snapping operation. For example, command object 193 (FIG. 1) may include an indication whether or not the editing operation includes a snapping operation, an identifier of a geometric element to which the snapping operation relates, and a logical point of the geometric element to which the snapping operation relates, e.g., as described below with reference to FIG. 9.

As indicated at block 816, the method may include applying the editing operation to the geometric element, e.g., at the second degree of detail, for example, by executing the command object. For example, client application 104 (FIG. 1) may modify second model data having the second degree of detail, e.g., the precision data as are described above. Accordingly, the editing operation may be rendered to the user of station 102 (FIG. 1) with respect to the geometric element at the second degree of detail, e.g., as described below with reference to FIG. 9. In one embodiment, applying the editing operation to the geometric element at the second degree of detail may be performed, for example, upon receiving and/or reading the second model data.

Figure 9:
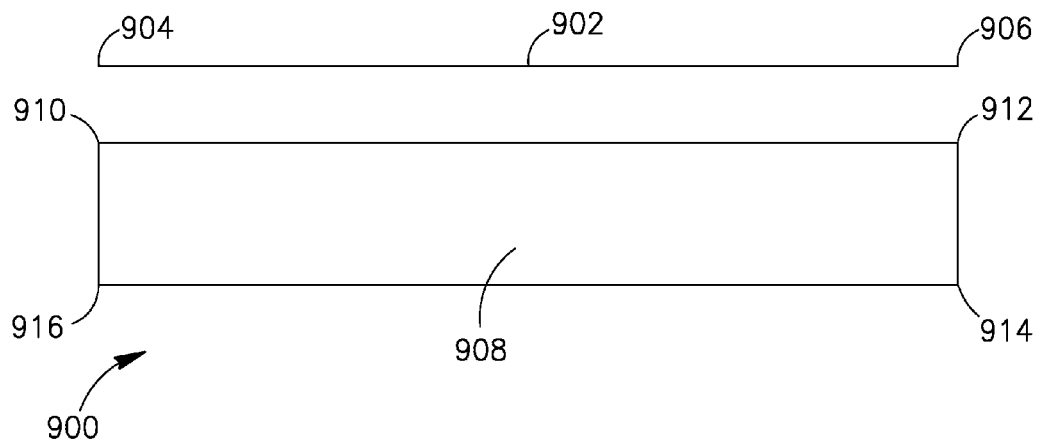
FIG. 9 is a schematic illustration of a two-dimensional model, in accordance with another demonstrative embodiment.

Reference is also made to FIG. 9, which schematically illustrates a two-dimensional model 900, in accordance with another demonstrative embodiment.

As shown in FIG. 9, model 900 includes a line 902 spanning between a first point 904 having the coordinates (0.4, 1.1) and a second point 906 having the coordinates (400.7, 1.1); and a rectangle 908 having an upper-left corner 910 at the coordinate (0.2, −100), an upper-right corner 912 at the coordinate (400, −100), a lower-left corner 916 at the coordinate (0.2, −200), and a lower-right corner 914 at the coordinate (400, −200).

In some embodiments, model 900 may be rendered to a user, e.g., the user of station 102 (FIG. 1) at a first degree of detail, for example, based on non-precise coordinates, e.g., truncated coordinates. For example, line 902 may be rendered to the user between points 904 and 906 at the coordinates (0, 1) and (401, 1), respectively.

In one embodiment, the user may apply a translation to line 902 at the first degree of level by dragging point 904 from the coordinate (0, 1) to the coordinate (0, 100). According to this embodiment, client application 104 (FIG. 1) may generate command object 193 (FIG. 1) corresponding to the editing operation performed by the user. For example, command object 193 (FIG. 1) may include an identifier of the edited geometric element, e.g., an ID value identifying line 902; an index value logically identifying point 904, e.g., an index value selected from a predefined set of four index values representing the four corners of a rectangle, respectively; and delta-x and delta-y values corresponding to the translation of point 904 at the first degree of detail, e.g., the values delta-x=0 and delta-y=99. Additionally, command object 193 (FIG. 1) may include a flag value ("the snapped flag") indicating whether or not the editing operation includes a snapping operation. For example, command object 193 (FIG. 1) may include a false value indicating that the snap operation was not performed. Command object 193 (FIG. 1) may be stored in association with a geometric section including line 902, e.g., as described above.

The user may be unaware that the editing of line 902 affected non-precise coordinates of model 900. The user may wish to zoom-in to view line 902 at second degree of detail, e.g., requiring the precise data of the coordinates of line 902. Client application 104 (FIG. 1) may execute command object 193 (FIG. 1) to apply the editing operation at the second degree of detail. For example, client application 104 (FIG. 1) may translate point 904 by delta-x=0 and delta-y=99 from the coordinates (0.4, 1.1) to the coordinates (0.4, 100.1) It is noted, that point 904 is moved up by 99 units at the second degree of detail, in accordance with the "intention" of the user when performing the editing operation at the first degree of detail.

In another embodiment, the user may apply a translation to line 902 at the first degree of detail by dragging point 904 to corner 910 using a snapping operation, e.g., using a suitable snapping mechanism that recognizes that the user is dragging the mouse close to corner 910. Accordingly, the snapping operation at the first degree of detail will result in moving point 904 from the coordinates (0, 1) to the coordinates (0, −100) of point 910. According to this embodiment, client application 104 (FIG. 1) may generate command object 193 (FIG. 1) corresponding to the snapping operation performed by the user. For example, the command object 193 (FIG. 1) corresponding to the snapping operation may include an identifier of the edited geometric element, e.g., an ID value identifying line 902; an index value logically identifying point 904; a snapped flag having a "true" value indicating that the editing operation includes a snapping operation; an identifier of the geometric element to which point 904 was snapped, e.g., an ID value identifying rectangle 908; and an index value logically identifying point 910 of rectangle 908, e.g. an index value representing the "upper-left corner" of rectangle 908. The command object 193 (FIG. 1) corresponding to the snapping operation may be stored in association with a geometric section including line 902, e.g., as described above. The command object 193 (FIG. 1) corresponding to the snapping operation may also be stored in association with a geometric section including rectangle 908, for example, if line 902 and rectangle 908 are included in separate geometric sections.

The user may be unaware that the editing of line 902 affected non-precise coordinates of model 900. The user may wish to zoom-in to view line 902 and/or rectangle 908 at second degree of detail, e.g., requiring the precise data of the coordinates of line 902 and/or rectangle 908. Client application 104 (FIG. 1) may execute the command object 193 (FIG. 1) corresponding to the snapping operation to apply the snapping operation at the second degree of detail. For example, based on the editing information of the command object, client application 104 (FIG. 1) may perform a snapping operation of point 904 with respect to point 910 at the second degree of detail. For example, client application 104 (FIG. 1) may snap point 904 to point 910 by translating point 904 from the coordinates (0.4, 1.1) to the coordinates (0.2, −100). Client application 104 (FIG. 1) may execute command object 193 (FIG. 1) corresponding to the snapping operation, for example, when reading the precision data of the geometric section including line 902 and/or the geometric section including rectangle 908. For example, client application 104 (FIG. 1) may execute command object 193 (FIG. 1) corresponding to the snapping operation a first time, for example, when reading the precision data of the geometric section including line 902; and a second time when reading the precision data of the geometric section including rectangle 908, e.g., if line 902 and rectangle 908 are included in separate geometric sections. It is noted, that point 904 is snapped to point 910 at the second degree of detail, in accordance with the "intention" of the user when performing the editing operation at the first degree of detail.

Figure 10:
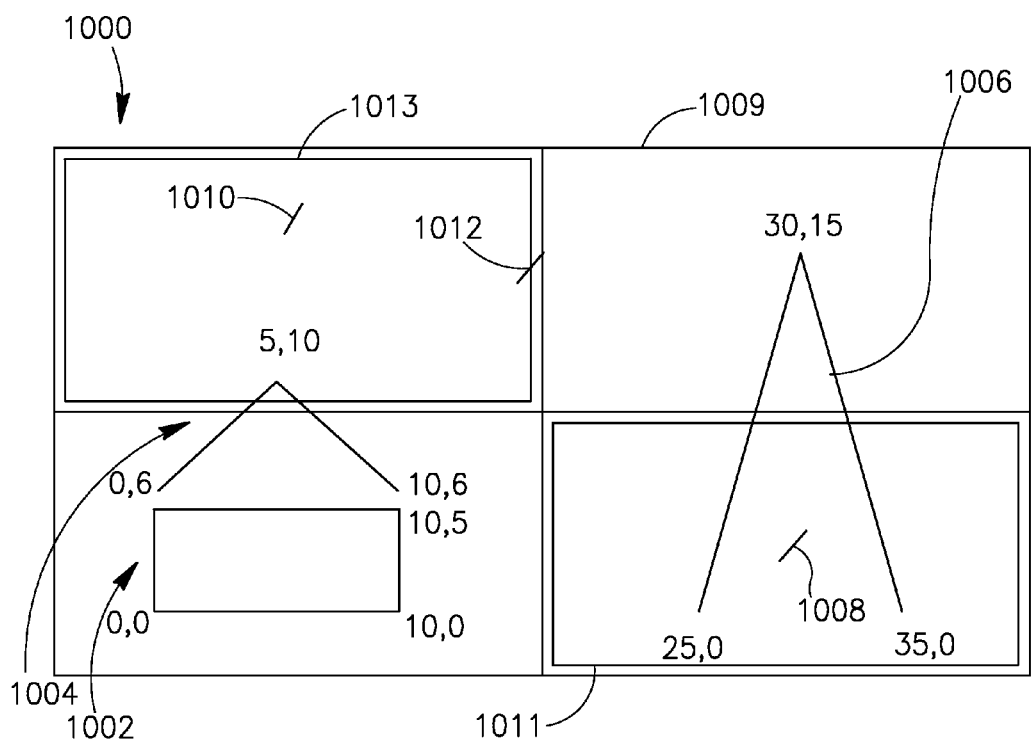
FIG. 10 is a schematic illustration of a two dimensional model distributed to a plurality of geometric sections, in accordance with one demonstrative embodiment.

Reference is now made to FIG. 10, which schematically illustrates a two-dimensional CAD model 1000 distributed to a plurality of geometric sections, in accordance with one demonstrative embodiment. In accordance with one demonstrative embodiment, the extents of model 1000 span between the values of 0 and 35 on the x-axis, and between 0 and 15 on the y-axis.

As shown in FIG. 10, model 1000 may include six geometric shapes 1002, 1004, 1006, 1008, 1010, and 1012. Shapes 1002, 1004 and/or 1006 may be similar to shapes 602, 604 and/or 606 (FIG. 6), respectively.

In some embodiments, CAD model 1000 may be received by CAD server 112 (FIG. 1). For example, the user of station 108 (FIG. 1) may upload CAD model 1000 to application server 116 (FIG. 1), e.g., via communication network 110 (FIG. 1).

In some embodiments, application server 116 (FIG. 1) may distribute CAD model 1000 to a plurality of geometric sections, e.g., as described above. For example, shapes 1002, 1004 and 1006 may be too big to be added to any section other than a first geometric section 1009 of a first pyramid layer, e.g., the biggest section, since for example, the rendering of shapes 1002, 1004 and 1006 in a viewport including section 1009 may require more than 4×4 pixels. Accordingly, application server 116 (FIG. 1) may add shapes 1002, 1004, and 1006 to section 1009. Shapes 1010 and 1008 may be small enough to be distributed to sections 1013 and 1011, respectively, of a second pyramid layer, e.g., assuming that the rendering of shapes 1010 and 1008 in sections 1013 and 1011, respectively, may require less then 4×4 pixels. Accordingly, application server 116 (FIG. 1) may distribute shapes 1010 and 1008 to geometric sections 1013 and 1011, respectively.

In some embodiments, application server 116 (FIG. 1) may generate dependencies file 171 (FIG. 1) corresponding to CAD model 1000, e.g., as described above. For example, application server 116 (FIG. 1) may generate dependencies file 171 (FIG. 1) including three sections, namely section 1009 at the first level, and sections 1011 and 1013 at the second level.

In some embodiments, compression server 114 (FIG. 1) may compress the geometric information of sections 1009, 1011 and 1013, e.g., as described above.

In some embodiments, CAD server 112 (FIG. 1) may generate four, e.g., separate, files including leading-points file 175, rough geometry file 173, precision-geometry file 177, and metadata file 179 corresponding to each of sections 1009, 1011, and 1013.

In some embodiments, a user of system 100 (FIG. 1), e.g., the user of station 102 (FIG. 1) may open CAD model 1000. For example, client application 104 (FIG. 1) may request from CAD server 112 (FIG. 1) the dependencies file 171 (FIG. 1) and header 183 (FIG. 1) corresponding to CAD model 1000.

In some embodiments, client application 104 (FIG. 1) may receive and parse dependencies file 171 (FIG. 1) and header 183 (FIG. 1). Client application 104 (FIG. 1) may select one or more geometric sections to be requested from CAD server 112 (FIG. 1), for example, based on dependencies file 171 (FIG. 1) and a required viewport to be rendered to the user of station 102 (FIG. 1), e.g., as described above. For example, if the requested viewport has the extents of CAD model 1000, client application 104 (FIG. 1) may request rough data of section 1009; and leading points data of sections 1011 and 1013.

In some embodiments, client application 104 (FIG. 1) may activate a "read" task for reading the data of a geometric section, for example, upon completing the downloading of data files corresponding to the section, e.g., as described above. Client application 104 (FIG. 1) may continue downloading data corresponding to one or more other geometric sections. Client application 104 (FIG. 1) may store the geometric data, which has been already "read", in any suitable format, for example, a custom format designed to store the geometric shapes of a CAD model.

In some embodiments, client application 104 (FIG. 1) may activate a "paint" task corresponding to the geometric section, e.g., after the read task has been completed, to paint the section. Client application 104 (FIG. 1) may continue downloading and/or reading data corresponding to one or more other geometric sections. The paint task may receive the geometric data, which has been read by the read task, and may render geometric data to the user of station 102 (FIG. 1).

In some embodiments, the user of station 102 (FIG. 1) may edit and/or manipulate the rendered CAD model 1000, e.g., after the data of all sections 1009, 1011 and 1013 has been read and painted.

In some embodiments, client application 104 (FIG. 1) may generate one or more command objects 193 (FIG. 1) in response to one or more editing operations performed by the user of station 102 (FIG. 1) with relation to CAD model 1000, e.g., as described above. For example, if the user edits shape 1010, then client application 104 (FIG. 1) may generate one or more command objects 193 (FIG. 1), and store the command objects 193 (FIG. 1) in association with section 1013 and any other affected sections, as described above.

In some embodiments, client application 104 (FIG. 1) may request from CAD server 112 (FIG. 1) additional data files corresponding to CAD model 1000, for example, based on editing and/or viewing operations performed by the user of station 102 (FIG. 1), e.g., as described above. For example, if the user of station 102 (FIG. 1) performs a zoom-in operation to zoom-in on one or more geometric sections of CAD model 1000, then client application 104 (FIG. 1) may request from CAD server 112 (FIG. 1) precision data file 177 (FIG. 1) corresponding to a geometric section, e.g., geometric section 1013, if the user zooms-in to view a geometric element in the section, e.g., shape 1010, at a level in which the rendering of the geometric element requires data beyond the decimal point.

It will be appreciated that the functionality of system 100 as shown in FIG. 1 may be implemented using any suitable system architecture including one or more communication networks, e.g., the Internet and/or Ethernet networks, to communicate between one or more storages, one or more servers and/or one or more stations, e.g., as described below.

Figure 11:
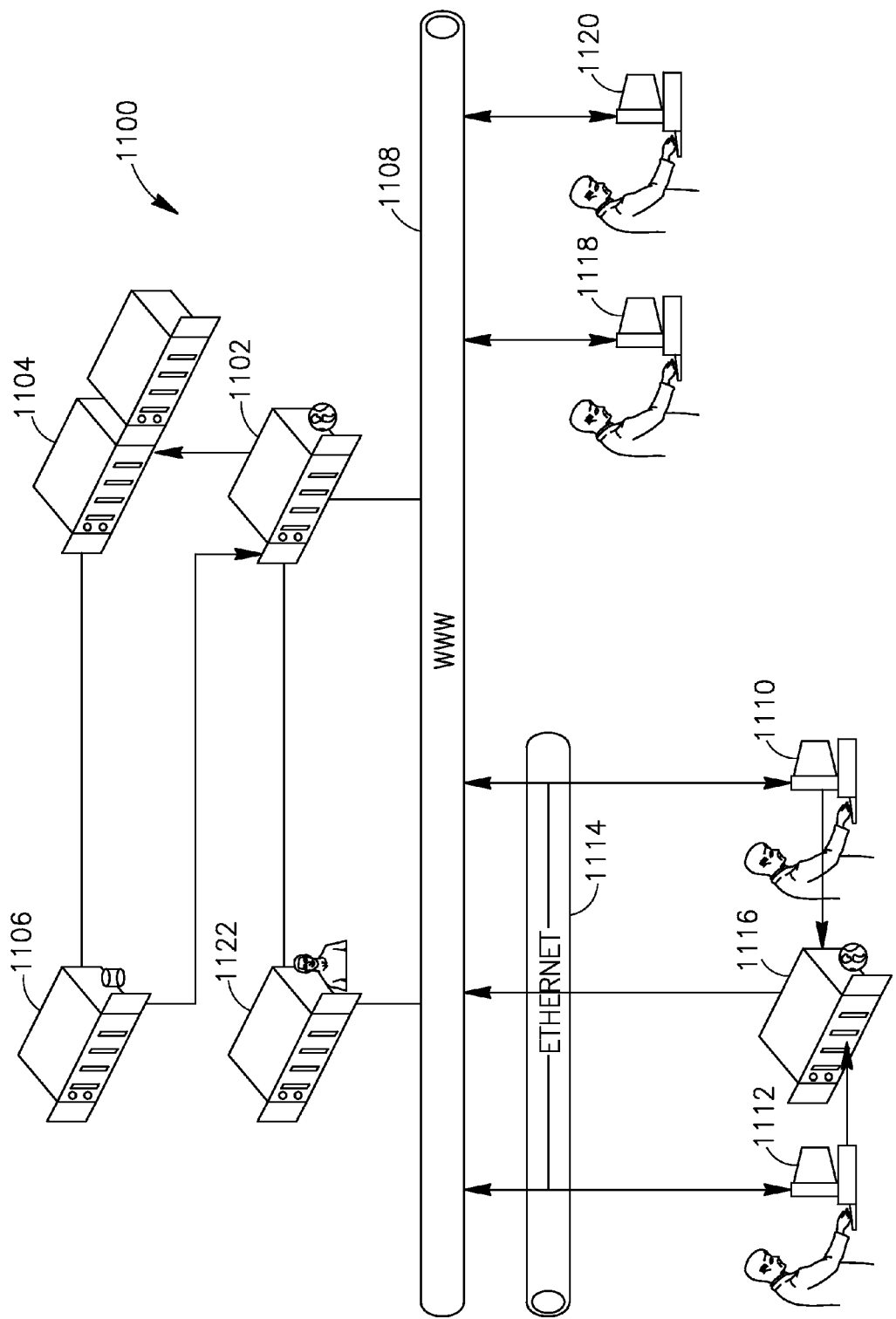
FIG. 11 is a schematic illustration of a system-architecture in accordance with one embodiment.

FIG. 11 schematically illustrates a system-architecture 1100 in accordance with one embodiment. System architecture 1100 may include, for example, a Software as a Service (SaaS) architecture capable of providing web-based CAD services to one or more users and/or enterprises.

Architecture 1100 may include at least one application server 1102, e.g., capable of performing the functionality of application server 116 (FIG. 1), associated with a compression server 1104, e.g., capable of performing the functionality of compression server 114 (FIG. 1), and a storage 1106, e.g., capable of performing the functionality of storage 118 (FIG. 1).

Application server 1102 may communicate with one or more stations over the internet 1108, to provide the stations with web-based CAD services, e.g., as are described above. For example, application server 1102 may provide the CAD services to one or more stations, e.g., stations 1110 and 1112, which may be connected by an Ethernet communication network 1114 and/or may share a common storage 1116. Additionally or alternatively, one or more stations, e.g., stations 1118 and 1120, may communicate with application server 1102 directly via Internet 1108.

In one example, application server 1102, compression server 1104 and/or storage 1106 may be hosted, operated and/or owned by a service provider, e.g., a SaaS software vendor, an Application Service Provider (ASP), and the like; and the users of stations 1110, 1112, 1118 and/or 1120 may be clients and/or customers of the service provider.

The user of station 1110 may provide to application server 1102 a CAD model stored on storage 1116. Application server 1102 may distribute geometric elements of the CAD model to a plurality of geometric sections, compression server 1104 may compress data of the geometric elements, and/or files corresponding to the geometric elements may be stored on storage 1106, e.g., as described above. A user of another station, e.g., a user of station 1112, may then request from application server 1102 one or more of the files corresponding to the CAD model, e.g., as described above.

Architecture 1100 may also include a suitable collaboration server 1122 to allow one or more of the stations to communicate in collaboration with application server 1102.

Figure 12:
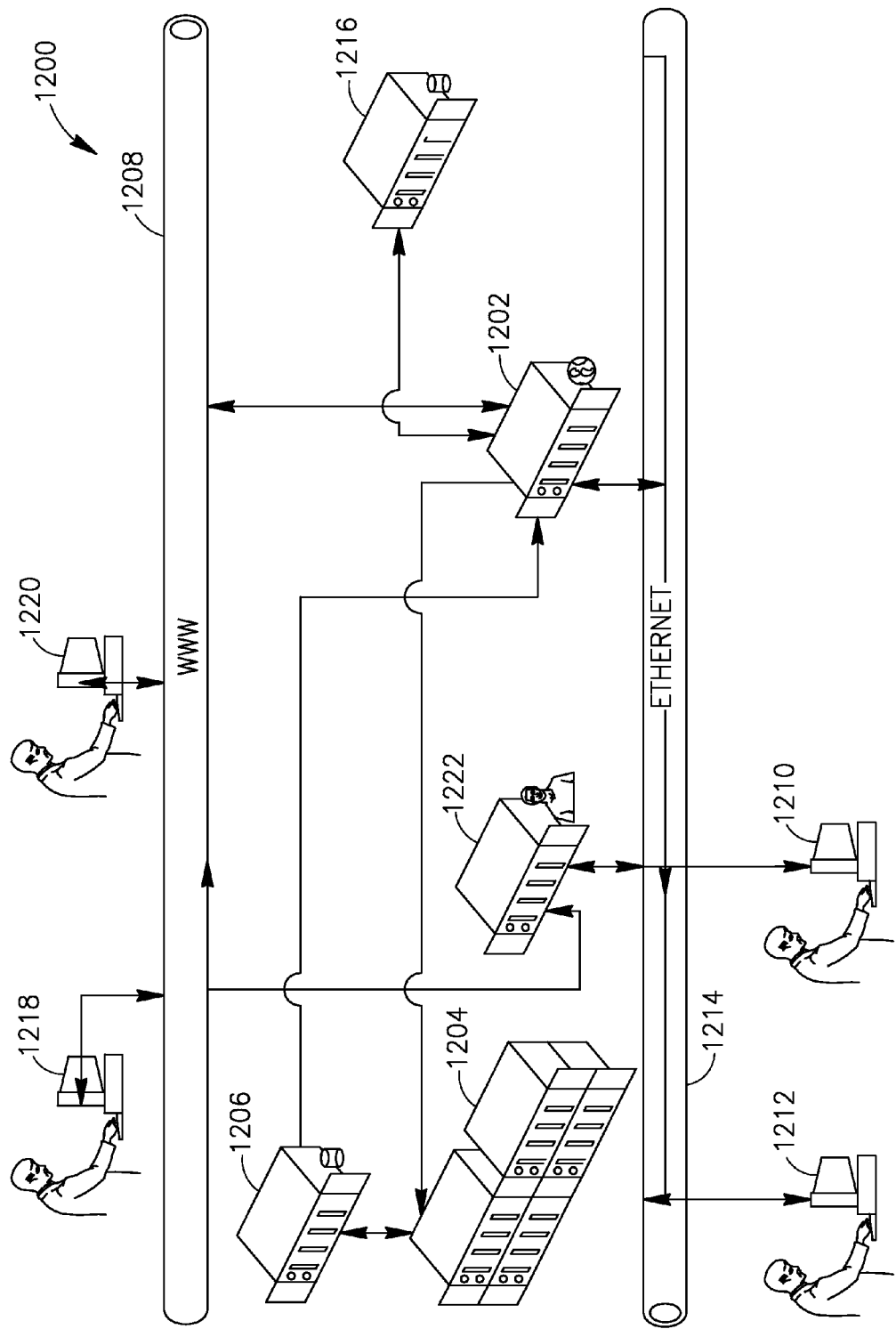
FIG. 12 is a schematic illustration of a system-architecture in accordance with another embodiment.

FIG. 12 schematically illustrates a system-architecture 1200 in accordance with another embodiment. System architecture 1200 may include, for example, a local architecture capable of providing local CAD services to one or more users, e.g., of an enterprise.

Architecture 1200 may include at least one application server 1202, e.g., capable of performing the functionality of application server 116 (FIG. 1), associated with a compression server 1204, e.g., capable of performing the functionality of compression server 114 (FIG. 1), and a storage 1206, e.g., capable of performing the functionality of storage 118 (FIG. 1).

Application server 1202 may directly communicate with one or more stations over a local Ethernet communication network 1214, to provide the stations with CAD services, e.g., as are described above. For example, application server 1202 may provide the CAD services to one or more stations, e.g., stations 1210 and 1212, which may be connected by Ethernet communication network 1214. Application server 1202 may also have access to an enterprise database 1216. Additionally or alternatively, one or more stations, e.g., stations 1218 and 1220, may communicate with application server 1202 via the Internet 1208.

The user of station 1210 may provide to application server 1202 a CAD model stored on database 1216. Application server 1202 may distribute geometric elements of the CAD model to a plurality of geometric sections, compression server 1204 may compress data of the geometric elements, and/or files corresponding to the geometric elements may be stored on storage 1206, e.g., as described above. A user of another station, e.g., a user of station 1212, may then request from application server 1202 one or more of the files corresponding to the CAD model, e.g., as described above.

Architecture 1200 may also include a suitable collaboration server 1222 to allow one or more of the stations to communicate in collaboration with application server 1202.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A system of computer aided design (CAD), the system comprising: A client application executing on a computer and configured to communicate with a sever and to render, on a display device, to a user a viewport including at least a portion of a CAD model based on data received from the server, wherein the client application is capable of: receiving section information from the server, wherein: the section information defines a plurality of geometric sections of the CAD model; the section information includes boundary information representing a plurality of boundaries defining the plurality of geometric sections, respectively, and a plurality of identifiers to identify the plurality of geometric sections, respectively and a plularity of geometric elements are distributed to the plurality of geometric sections by the server, wherein each of the plurality of geometric elements comprises a two-dimensional or three dimensional geometric entity figure, shape, and/or contour that is defined by one or more vertices, points and/or lines; selecting at least one section of the plurality of sections based on a intersecting relationship between the viewport and the boundaries of the plurality of geometric sections; requesting, from the server one or more files corresponding to the at least one selected section, wherein the one or more files include information of one or more of the plurality of geometric elements of the CAD model, which are included within the boundary of the selected section; receiving the one or more files corresponding to the at least one selected section; and rendering the viewport based on the one or more files.

2. The system of claim 1, wherein the client application is to select the at least one section by selecting one or more sections intersecting with the viewport.

3. The system of claim 1, wherein the client application is to request from the server the one or more files corresponding to a plurality of selected sections by sending to the server, substantially simultaneously, a plurality of requests via two or more communication channels.

4. The system of claim 3, wherein the section information includes size information representing data sizes of the plurality of sections, and wherein the client application is to distribute the plurality of requests to the channels based on the data sizes of the selected sections.

5. The system of claim 1, wherein the client application comprises a single threaded application, and wherein the client application comprises a task manager to manage, according to a multitasking scheme, a plurality of operations for rendering the CAD model by wrapping the plurality of operations by a plurality of respective task objects and assigning the task objects to a plurality of execution queues.

6. The system of claim 5, wherein the plurality of operations include at least one of a data-retrieval operation to retrieve the data corresponding to one or more portions of the CAD model, a construction operation to construct the one or more portions based on the retrieved data, and an editing operation to edit the CAD model.

7. The system of claim 1, wherein the one or more files include at least one of a leading-points file including leading point data of the one or more elements, a rough-geometry file including rough geometry data of the one or more elements, a precision-geometry file including precision data of the one or more elements, and a metadata file including metadata corresponding to the one or more elements.

8. The system of claim 7, wherein the client application is to request the precise-geometry file corresponding to the selected section, if a ratio between a width of the viewport and a display width for displaying the viewport is less than a resolution of the display.

9. The system of claim 1, wherein at least one of the requested files corresponding to the selected section includes spatially compressed geometric information corresponding the section and one or more parameters of a predefined compression scheme, and wherein the client application is capable of decompressing the compressed geometric information based on the one or more parameters.

10. The system of claim 9, wherein the one or more parameters include a bit size of a compressed coordinate, which is less than a bit-size of a coordinate of the CAD model.

11. The system of claim 1 comprising the server, wherein the server comprises a stateless server to handle the request for one or more files independently from another request for one or more files.

12. The system of claim 1, wherein the plurality of geometric sections are defined according to a pyramid scheme including one or more pyramid structures, wherein each pyramid structure includes one or more levels, and wherein each level includes at least one geometric section.

13. The system of claim 12, wherein at least one of said pyramid structures includes a plurality of levels, and wherein the number of sections in each level is at least two times the number of sections in an immediately-preceding level.

14. A method of computer aided design (CAD), the method comprising: receiving from a server section information defining a plurality of geometric sections of a CAD model, wherein: the section information includes boundary information representing a plurality of boundaries defining the plurality of geometric sections, respectively, and a plurality of identifiers to identify the plurality of geometric sections, respectively and a plurality of geometric elements are distributed to the plurality of geometric sections by the server, wherein each of the plurality of geometric elements comprises a two-dimensional or three dimensional geometric entity figure, shape, and/or contour that is defined by one or more vertices, points and/or lines; selecting at least one section of the plurality of sections based on a intersecting relationship between the viewport and the boundaries of the plurality of geometric sections; requesting, from the server one or more files corresponding to the at least one selected section, wherein the one or more files include information of one or more of the plurality of geometric elements of the CAD model, which are included within the boundary of the selected section; receiving the one or more files corresponding to the at least one selected section; and rendering the viewport based on the one or more files.

15. The method of claim 14, wherein selecting the at least one section comprises selecting one or more sections intersecting with the viewport.

16. The method of claim 14 comprising requesting from the server the one or more files corresponding to a plurality of selected sections by sending to the server, substantially simultaneously, a plurality of requests via two or more communication channels.

17. The method of claim 16 comprising distributing the plurality of requests to the channels based on the data sizes of the selected sections.

18. The method of claim 14 comprising managing, according to a multitasking scheme, a plurality of operations for rendering the CAD model by wrapping the plurality of operations by a plurality of respective task objects and assigning the task objects to a plurality of execution queues.

19. The method of claim 18, wherein the plurality of operations include at least one of a data-retrieval operation to retrieve the data corresponding to one or more portions of the CAD model, a construction operation to construct the one or more portions based on the retrieved data, and an editing operation to edit the CAD model.

20. The method of claim 14, wherein the one or more files include at least one of a leading-points file including leading point data of the one or more elements, a rough-geometry file including rough geometry data of the one or more elements, a precision-geometry file including precision data of the one or more elements, and a metadata file including metadata corresponding to the one or more elements.

21. The method of claim 20, wherein requesting the one or more files corresponding to the selected section comprises requesting the precise-geometry file corresponding to the selected section, if a ratio between a width of the viewport and a display width for displaying the viewport is less than a resolution of the display.

22. The method of claim 14, wherein at least one of the requested files corresponding to the selected section includes spatially compressed geometric information corresponding the section and one or more parameters of a predefined compression scheme, and wherein the method comprises decompressing the compressed geometric information based on the one or more parameters.

23. The method of claim 22, wherein the one or more parameters include a bit size of a compressed coordinate, which is less than a bit-size of a coordinate of the CAD model.

24. The method of claim 14, wherein the plurality of geometric sections are defined according to a pyramid scheme including one or more pyramid structures, wherein each pyramid structure includes one or more levels, and wherein each level includes at least one geometric section.

25. The method of claim 24, wherein at least one of said pyramid structures includes a plurality of levels, and wherein the number of sections in each level is at least two times the number of sections in an immediately-preceding level.

26. A computer program product comprising a non-transitory computer-useable medium having executable programming instructions stored thereon, wherein the executable program instructions when executed on a computer causes the computer to: receive from a server section information defining a plurality of geometric sections of a CAD model, wherein: the section information includes boundary information representing a plurality of boundaries defining the plurality of geometric sections, respectively, and a plurality of identifiers to identify the plurality of geometric sections, respectively and a plurality of geometric elements are distributed to the plurality of geometric sections by the server, wherein each of the plurality of geometric elements comprises a two-dimensional or three dimensional geometric entity figure, shape, and/or contour that is defined by one or more vertices, points and/or lines; selecting at least one section of the plurality of sections based on a intersecting relationship between the viewport and the boundaries of the plurality of geometric sections; requesting, from the server one or more files corresponding to the at least one selected section, wherein the one or more files include information of one or more of the plurality of geometric elements of the CAD model, which are included within the boundary of the selected section; receiving the one or more files corresponding to the at least one selected section; and rendering the viewport based on the one or more files.

27. The computer program product of claim 26, wherein the computer-readable program causes the computer to select one or more sections intersecting with the viewport.

28. The computer program product of claim 26, wherein the computer-readable program causes the computer to request from the server the one or more files corresponding to a plurality of selected sections by sending to the server, substantially simultaneously, a plurality of requests via two or more communication channels.

29. The computer program product of claim 26, wherein the computer-readable program causes the computer to manage, according to a multitasking scheme, a plurality of operations for rendering the CAD model by wrapping the plurality of operations by a plurality of respective task objects and assigning the task objects to a plurality of execution queues.

30. The computer program product of claim 26, wherein the one or more files include at least one of a leading-points file including leading point data of the one or more elements, a rough-geometry file including rough geometry data of the one or more elements, a precision-geometry file including precision data of the one or more elements, and a metadata file including metadata corresponding to the one or more elements.

31. The computer program product of claim 30, wherein the computer-readable program causes the computer to request the precise-geometry file corresponding to the selected section, if a ratio between a width of the viewport and a display width for displaying the viewport is less than a resolution of the display.

32. The computer program product of claim 26, wherein at least one of the requested files corresponding to the selected section includes spatially compressed geometric information corresponding the section and one or more parameters of a predefined compression scheme, and wherein the computer-readable program causes the computer to decompress the compressed geometric information based on the one or more parameters.

33. The computer program product of claim 32, wherein the one or more parameters include a bit size of a compressed coordinate, which is less than a bit-size of a coordinate of the CAD model.

34. The computer program product of claim 26, wherein the plurality of geometric sections are defined according to a pyramid scheme including one or more pyramid structures, wherein each pyramid structure includes one or more levels, and wherein each level includes at least one geometric section.

* * * * *